United States Patent
Isurugi et al.

(10) Patent No.: US 9,403,293 B2
(45) Date of Patent: Aug. 2, 2016

(54) METHOD FOR FORMING ANODIZED LAYER, METHOD FOR PRODUCING MOLD, METHOD FOR PRODUCING ANTIREFLECTIVE FILM, AND MOLD AND ANTIREFLECTIVE FILM

(75) Inventors: Akinobu Isurugi, Osaka (JP); Kiyoshi Minoura, Osaka (JP); Takao Imaoku, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1150 days.

(21) Appl. No.: 13/392,902

(22) PCT Filed: Aug. 31, 2010

(86) PCT No.: PCT/JP2010/064798
§ 371 (c)(1),
(2), (4) Date: Feb. 28, 2012

(87) PCT Pub. No.: WO2011/027746
PCT Pub. Date: Mar. 10, 2011

(65) Prior Publication Data
US 2012/0156430 A1     Jun. 21, 2012

(30) Foreign Application Priority Data
Sep. 4, 2009   (JP) ................................. 2009-204894

(51) Int. Cl.
*C25D 11/12* (2006.01)
*B29C 33/38* (2006.01)
(Continued)

(52) U.S. Cl.
CPC .......... *B29C 33/3814* (2013.01); *B29C 33/424* (2013.01); *C25D 11/024* (2013.01);
(Continued)

(58) Field of Classification Search
CPC .............................. C25D 11/024; C25D 11/12
USPC ....................................................... 205/324
See application file for complete search history.

(56) References Cited

U.S. PATENT DOCUMENTS 4,566,952 A    1/1986  Sprintschnik et al.
4,606,975 A    8/1986  Mohr
(Continued)

FOREIGN PATENT DOCUMENTS

EP    0121880 A1    10/1984
EP    1785748 A1    5/2007
(Continued)

OTHER PUBLICATIONS

086 "What is Anodizing (Anodic Oxidation Process)?" accessed from www.misumi-techcentral.com on May 6, 2015.*
(Continued)

*Primary Examiner* — Bryan D. Ripa
(74) *Attorney, Agent, or Firm* — Harness, Dickey & Pierce, P.L.C.

(57) ABSTRACT

An anodized layer formation method of an embodiment of the present invention includes the steps of: (a) providing an aluminum base which has a surface that is made of aluminum; (b) anodizing the surface to form a barrier-type alumina layer; and (c) after step (b), further anodizing the surface to form a porous alumina layer which has a plurality of minute recessed portions. According to an embodiment of the present invention, a method is provided that enables formation of a porous alumina layer which has an interpore distance of a desired magnitude with the use of an aluminum base which has a surface that is made of aluminum, irrespective of the surface form.

4 Claims, 10 Drawing Sheets

(51) Int. Cl.
  *B29C 33/42*   (2006.01)
  *C25D 11/24*   (2006.01)
  *G02B 1/118*   (2015.01)
  *C25D 11/02*   (2006.01)
  *C25D 11/04*   (2006.01)

(52) U.S. Cl.
  CPC ............. *C25D11/045* (2013.01); *C25D 11/12* (2013.01); *C25D 11/24* (2013.01); *G02B 1/118* (2013.01); *B29K 2905/02* (2013.01); *Y10T 428/24355* (2015.01)

(56) References Cited

U.S. PATENT DOCUMENTS

| | | | |
|---|---|---|---|
| 5,230,788 | A | 7/1993 | Rabiet et al. |
| 6,359,735 | B1 | 3/2002 | Gombert et al. |
| 2003/0205475 | A1 | 11/2003 | Sawitowski |
| 2005/0178664 | A1* | 8/2005 | Ostrovsky ............... 205/91 |
| 2005/0211663 | A1 | 9/2005 | Imada et al. |
| 2007/0159698 | A1* | 7/2007 | Taguchi et al. ............. 359/586 |
| 2008/0274375 | A1* | 11/2008 | Ng et al. ............. 428/687 |
| 2009/0236228 | A1* | 9/2009 | Yamamoto et al. ............. 205/83 |

FOREIGN PATENT DOCUMENTS

| | | | |
|---|---|---|---|
| EP | 2426237 | A1 | 3/2012 |
| JP | 60-056093 | A | 4/1985 |
| JP | 2001517319 | A | 10/2001 |
| JP | 2002-004087 | A | 1/2002 |
| JP | 2003531962 | A | 10/2003 |
| JP | 2005156695 | A | 6/2005 |
| JP | 2005-307340 | A | 11/2005 |
| JP | 2006328467 | A * | 12/2006 |
| JP | 2008-166602 | A | 7/2008 |
| JP | 2008223073 | A * | 9/2008 |
| WO | WO-2006059686 | A1 | 6/2006 |
| WO | WO-2008/082421 | A1 | 7/2008 |

OTHER PUBLICATIONS

International Preliminary Report on Patentability dated Apr. 19, 2012.

Lee, W. et al., "Fast fabrication of lang-range ordered porous alumina membranes by hard anondization", Nature Materials, vol. 5, Aug. 20, 2006, pp. 741-747.

International Search Report.

Krishnan et al., "Monodomain High-Aspect-Ratio 2D and 3D Ordered Porous Alumina Structures with Independently Controlled Pore Spacing and Diameter," Advanced Materials, 2007, p. 988-992, vol. 19, Wiley-VCH Verlag GmbH & Co. KGaA, Weinheim.

* cited by examiner

FIG. 6
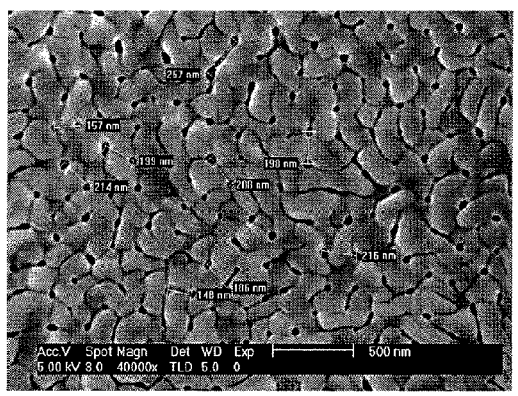 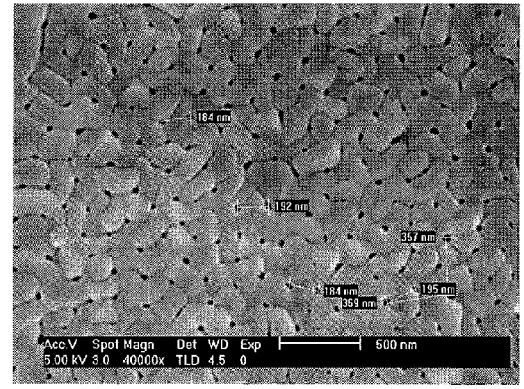
(a)                                              (b)

*FIG.8A*
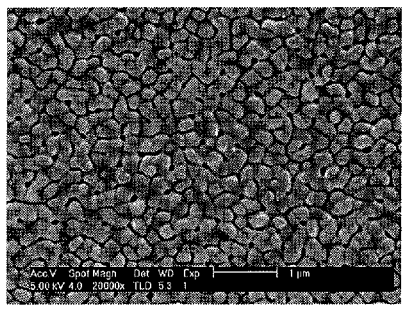
(a)
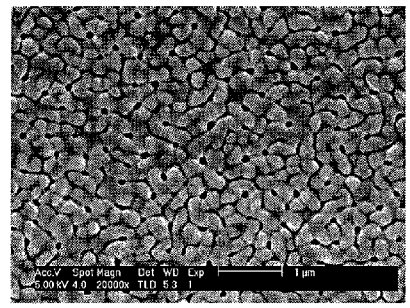
(b)
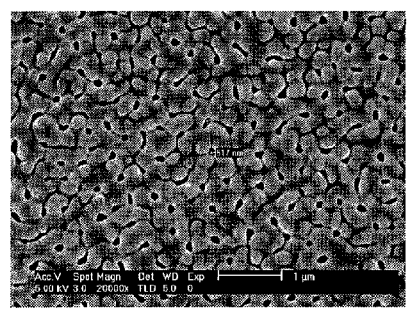
(c)
*FIG.8B*
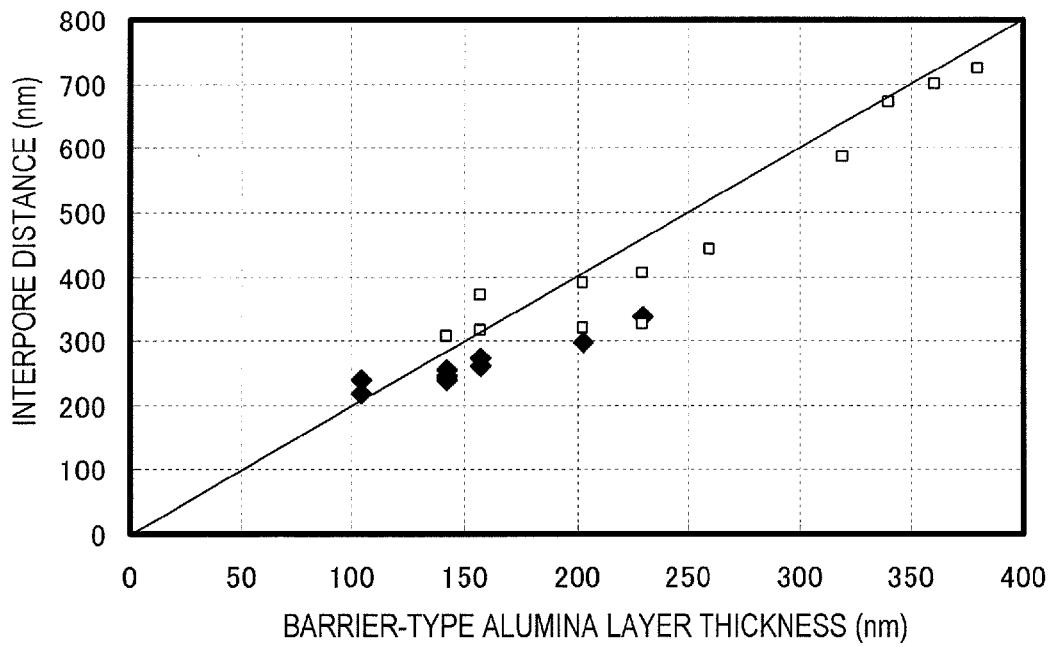

FIG.8C
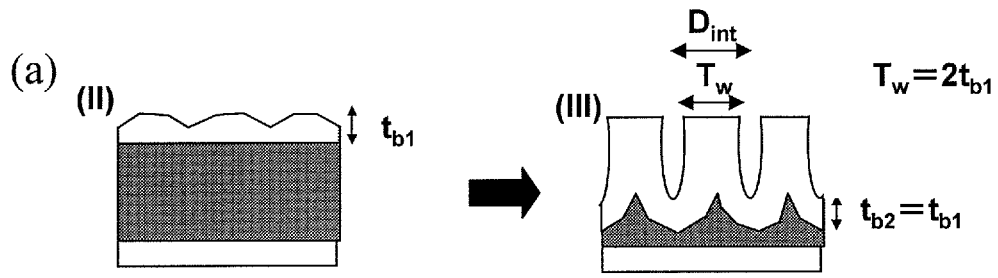
(a)
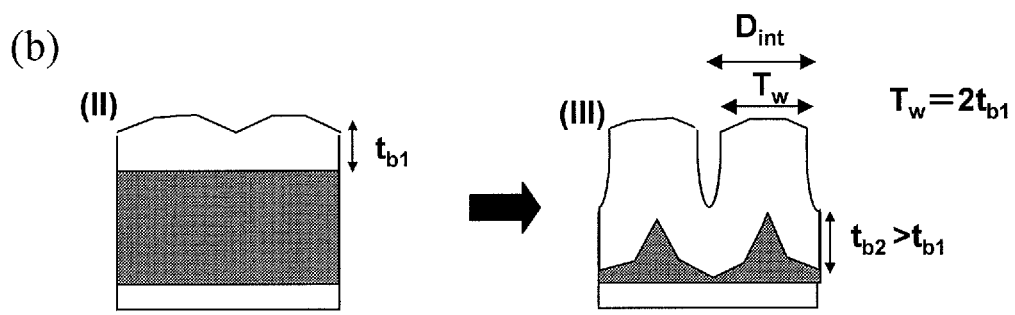
(b)
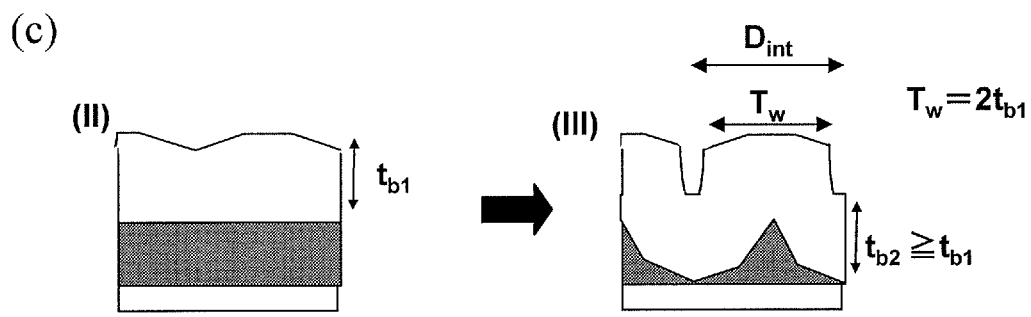
(c)

METHOD FOR FORMING ANODIZED LAYER, METHOD FOR PRODUCING MOLD, METHOD FOR PRODUCING ANTIREFLECTIVE FILM, AND MOLD AND ANTIREFLECTIVE FILM

TECHNICAL FIELD

The present invention relates to a method of forming an anodized layer, a method of fabricating a mold, and a mold. In this specification, the "mold" includes molds that are for use in various processing methods (stamping and casting), and is sometimes referred to as a stamper. The mold can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (minute recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina layer may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The applicant of the present application discloses, in Patent Document 4, the technique of forming an antireflection film with the use of an alumina layer in which minute recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 µm and less than 100 µm. The entire disclosures of Patent Documents 1, 2, and 4 are herein incorporated by reference.

Utilizing an anodized porous aluminum film can facilitate the fabrication of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film manufacturing method with the use of a moth-eye mold uses a photocurable resin. Firstly, a photocurable resin is applied over a substrate. Then, an uneven surface of a moth-eye mold which has been provided with a mold release treatment is pressed against the photocurable resin in vacuum. Thereafter, the uneven structure is filled with the photocurable resin. Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of manufacturing an antireflection film with the use of the photocurable resin is disclosed in, for example, Patent Document 4.

Non-patent Document 1 discloses an anodization method wherein an oxalic acid aqueous solution is used as an electrolytic solution, and a mirror-finished surface of an aluminum substrate undergoes an anodization with a relatively low voltage, e.g., 40 V (MA: mild anodization) before an anodization with a relatively high voltage, e.g., 100 V to 160 V (HA: hard anodization). The subject matter of Non-patent Document 1 is to form a porous alumina layer that has an array of micropores which has extremely high regularity by taking advantage of self organization. Non-patent Document 1 states that a self-organized porous alumina layer of high regularity with an interpore distance of 220 nm to 300 nm, which would not obtained by the conventional MA, was successfully formed according to the above method. In the MA step, to prevent occurrence of a breakdown in the HA step, it is necessary to form a porous alumina layer with a thickness of not less than 400 nm.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

Non-Patent Literature

Non-patent Document 1: Woo Lee, Ran Ji, Ulrich Gosele & Kornelius Nielsch, Fast fabrication of long-range ordered porous alumina membranes by hard anodization, Nature Materials 20 Aug. 2006, vol. 5, 741-747

SUMMARY OF INVENTION

Technical Problem

The present inventor attempted to form a porous alumina layer which has an interpore distance of greater than 200 nm by anodizing an aluminum film (1 μm thick) deposited on a glass substrate according to the method disclosed in Patent Document 4, but formation of such a porous alumina layer failed.

As a result of the researches conducted by the present inventor, it was found that the aluminum film was an aggregate of crystal grains whose average grain diameter was 180 nm to 190 nm and that the interpore distance of the porous alumina layer formed over the surface of such an aluminum film was restricted by the grain diameter of the crystal grains that formed the aluminum film.

The present invention was conceived for the purpose of solving the above problems. One of the major objects of the present invention is to provide a method that enables formation of a porous alumina layer which has an interpore distance of a desired magnitude with the use of an aluminum base which has a surface that is made of aluminum, irrespective of the surface form. Specifically, the object is to provide a method that enables formation of a porous alumina layer which has a large interpore distance, without being restricted by the grain diameter of crystal grains that form the surface of the aluminum film.

Solution to Problem

An anodized layer formation method of the present invention includes the steps of: (a) providing an aluminum base which has a surface that is made of aluminum; (b) anodizing the surface to form a barrier-type alumina layer; and (c) after step (b), further anodizing the surface to form a porous alumina layer which has a plurality of minute recessed portions. Here, examples of the aluminum base which has a surface that is made of aluminum include an aluminum base which is entirely made of aluminum (sometimes referred to as "a bulk of an aluminum material"). The examples of the aluminum base also include an aluminum base which is composed of a substrate that is made of a non-aluminum material (e.g., glass substrate) and an aluminum film that is formed over the substrate.

In one embodiment, step (b) is performed in a first electrolytic solution, and step (c) is performed in a second electrolytic solution which is different from the first electrolytic solution.

In one embodiment, pH of the first electrolytic solution is more than 3.0 and less than 8.0.

In one embodiment, the first electrolytic solution is an aqueous solution containing at least one of acids or salts selected from a group consisting of ammonium tartrate, potassium sodium tartrate, boric acid, ammonium borate, ammonium oxalate, ammonium citrate, maleic acid, malonic acid, phthalic acid, and citric acid.

In one embodiment, the anodization in step (c) is performed with application of a pulse voltage, the pulse voltage having a pulse width of not more than 200 msec and a pulse interval of not less than 800 msec.

In one embodiment, the method further includes: (d) after step (c), bringing the porous alumina layer into contact with an etching solution, thereby enlarging the plurality of minute recessed portions of the porous alumina layer; and (e) after step (d), further performing the anodization to grow the plurality of minute recessed portions.

In one embodiment, step (a) includes providing an aluminum film deposited on a substrate.

A mold fabrication method of the present invention is a method of fabricating a mold which has an inverted moth-eye structure in its surface using any of the above-described anodized layer formation methods, the mold fabrication method including the step of forming a porous alumina layer which has a plurality of minute recessed portions whose two-dimensional size viewed in a direction normal to the surface is not less than 50 nm. When the mold is used as a mold for manufacture of an antireflection film, the two-dimensional size of the plurality of minute recessed portions is preferably less than 500 nm when viewed in a direction normal to the surface.

A mold of the present invention is a mold fabricated using the above-described fabrication method. The mold includes a porous alumina layer which has an inverted moth-eye structure in its surface, the inverted moth-eye structure having a plurality of minute recessed portions whose two-dimensional size viewed in a direction normal to the surface is not less than 50 nm and less than 500 nm.

An antireflection film manufacturing method of the present invention includes the steps of: providing the above-described mold and a work; and irradiating a UV-curable resin provided between the mold and the work with ultraviolet light through the mold, thereby curing the UV-curable resin.

An antireflection film of the present invention is an antireflection film manufactured using the above-described method, wherein the antireflection film has a plurality of raised portions in its surface, the plurality of raised portions having a base whose diameter is not less than 50 nm and less than 500 nm.

In one embodiment, the second electrolytic solution is an aqueous solution containing an acid selected from a group consisting of oxalic acid, tartaric acid, phosphoric acid, chromic acid, citric acid, and malic acid.

In one embodiment, the interval of micropores of the porous alumina layer is not less than 400 nm.

Advantageous Effects of Invention

According to the present invention, a method is provided that enables formation of a porous alumina layer which has an interpore distance of a desired magnitude with the use of an aluminum base which has a surface that is made of aluminum, irrespective of the surface form. Specifically, a method is provided that enables formation of a porous alumina layer which has a large interpore distance, without being restricted by the grain diameter of crystal grains that form the surface of the aluminum film.

BRIEF DESCRIPTION OF DRAWINGS

FIG. 6 (a) and (b) show SEM images of the surfaces of the porous alumina layers of Comparative Examples 1 and 2.

FIG. 8A (a) to (c) show SEM images of the surfaces of the porous alumina layers of Comparative Examples 3 to 5.

FIG. 8B A graph which represents the relationship between the thickness and the interpore distance (average value) in the barrier-type alumina layers of Inventive Examples 1 to 9 (|) and a graph which represents the relationship between the thickness and the interpore distance in the barrier-type alumina layers of Inventive Examples 10 to 21 (□).

FIG. 8C (a) to (c) are schematic diagrams for illustrating a mechanism through which a porous alumina layer is formed.

(a), (b), and (c) respectively show a case where a relatively low voltage is applied without formation of a barrier-type alumina layer, a case where a relatively high voltage is applied without formation of a barrier-type alumina layer, and a case where a relatively high voltage is applied after formation of a barrier-type alumina layer.

Figure 9:
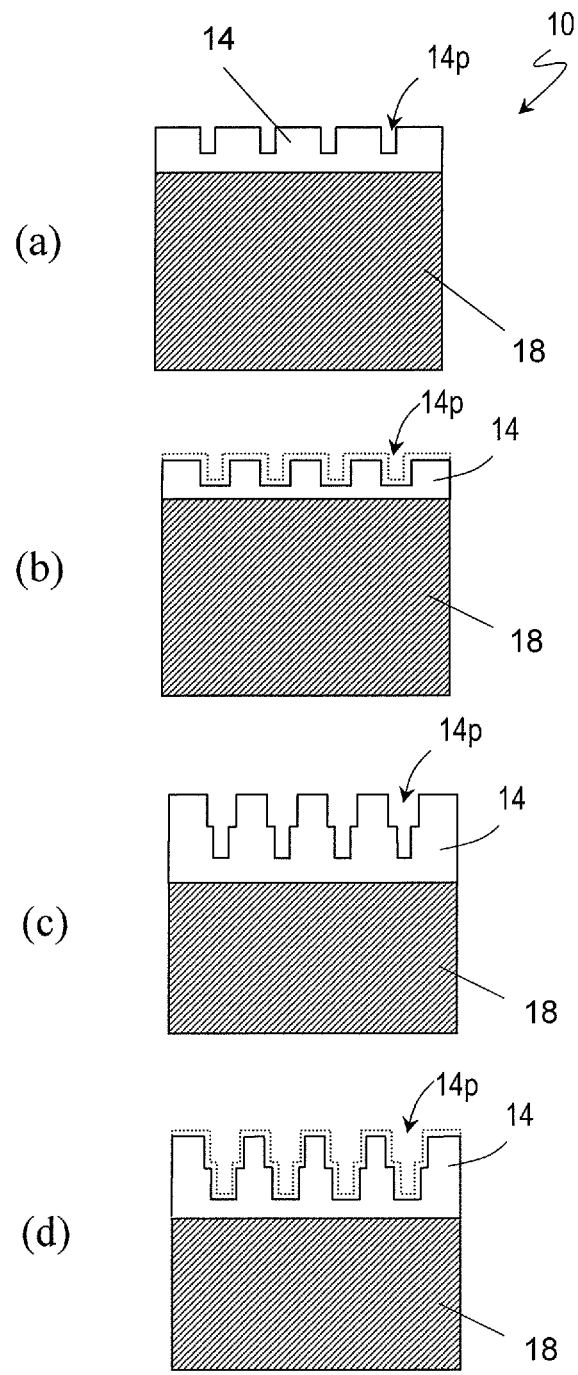

FIG. 9 (a) to (d) are schematic cross-sectional views for illustrating a method of fabricating a moth-eye mold 100A.

Figure 10:
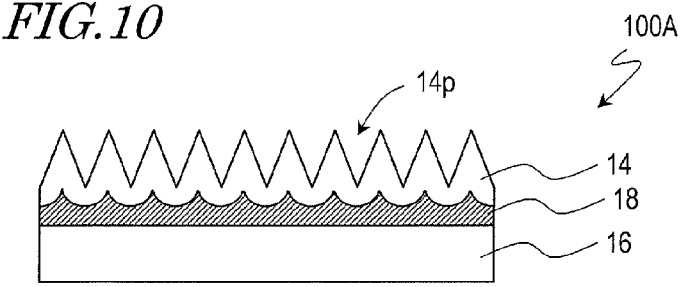

FIG. 10 A schematic cross-sectional view of the moth-eye mold 100A.

Figure 11:
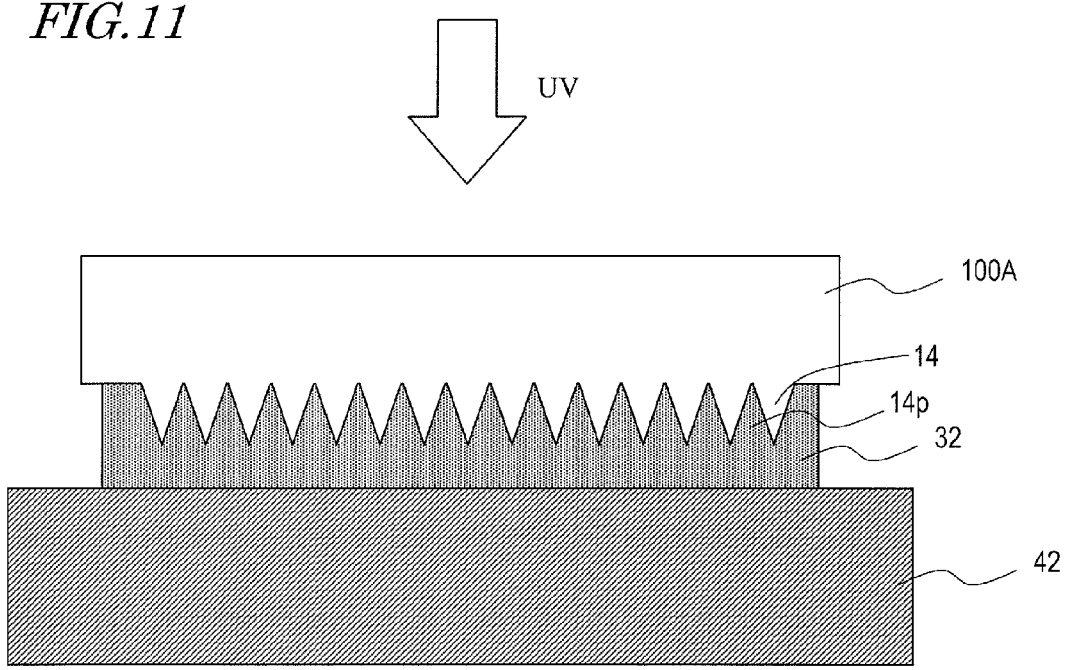

FIG. 11 A schematic cross-sectional view for illustrating the process of manufacturing an antireflection film with the use of the moth-eye mold 100A.

DESCRIPTION OF EMBODIMENTS

Hereinafter, a method of forming an anodized layer according to an embodiment of the present invention is described with reference to the drawings, although the present invention is not limited to the embodiment exemplified below. Note that the anodized layer formation method of the present invention is a method of forming an anodized layer that has a porous alumina layer in its surface, for example, which is preferably used in manufacturing an antireflection film that has a moth-eye structure, and is not limited to a method of forming a porous alumna layer of high periodicity. Rather, it is preferably used for forming an anodized layer which has a porous alumina layer that has a micropore arrangement of low regularity. In an example described herein, an aluminum base used has an aluminum film which is formed on a substrate (e.g., glass substrate) using a thin film deposition technique, although the embodiment of the present invention is applicable to a bulk of an aluminum material.

Figure 1:
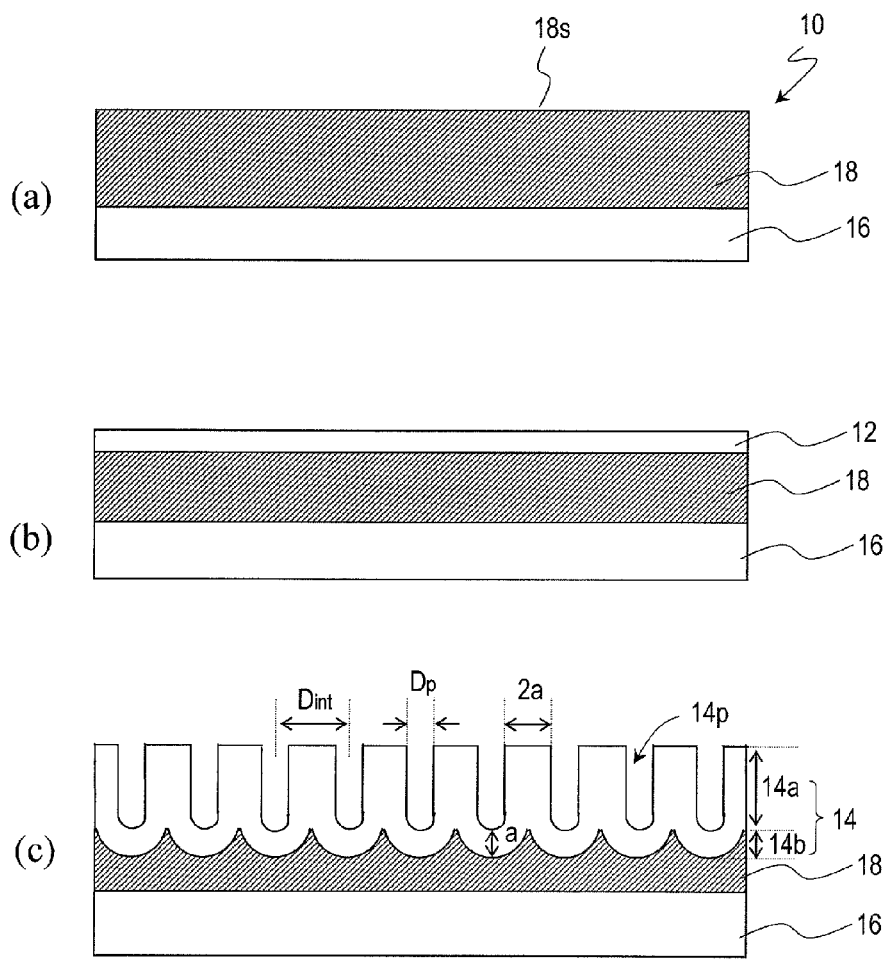
FIG. 1 (a) to (c) are diagrams for illustrating a method of forming an anodized layer according to an embodiment of the present invention.

The anodized layer formation method of the embodiment of the present invention includes, as shown in FIGS. 1(a) to 1(c), the step of providing an aluminum base 10 which has a surface that is made of aluminum (here, an aluminum base 10 including a substrate 16 and an aluminum film 18 deposited on the substrate 16) (FIG. 1(a)), the step of anodizing the surface (here, a surface 18s of the aluminum film 18) to form a barrier-type alumina layer 12 (FIG. 1(b)), and thereafter, the step of further anodizing the surface 18s to form a porous alumina layer 14 which has a plurality of minute recessed portions 14p (FIG. 1(c)). The anodized layer formation method of the embodiment of the present invention has an advantageous feature in that a porous alumina layer is formed after a barrier-type alumina layer has been formed. In the beginning, the differences between the barrier-type alumina layer and the porous alumina layer are described.

It is known that, when aluminum is anodized, not only the above-described porous alumina layer which has micropores but also a barrier-type alumina layer which does not have micropores may be formed according to the type of the electrolytic solution. If an electrolytic solution which has a property to dissolve alumina (an acidic or alkaline aqueous solution) is used, a porous alumina layer is formed. If an electrolytic solution which does not have a property to dissolve alumina (a neutral or thin acidic aqueous solution) is used, a barrier-type alumina layer is formed.

The barrier-type alumina layer may be formed, for example, by anodization in a neutral electrolytic solution (here, pH is more than 3.0 and less than 8.0). The neutral electrolytic solution used may be, for example, ammonium tartrate, boric acid, or sodium borate. The thickness of the barrier-type alumina layer is generally proportional to the applied voltage in the anodization.

Figure 2A:
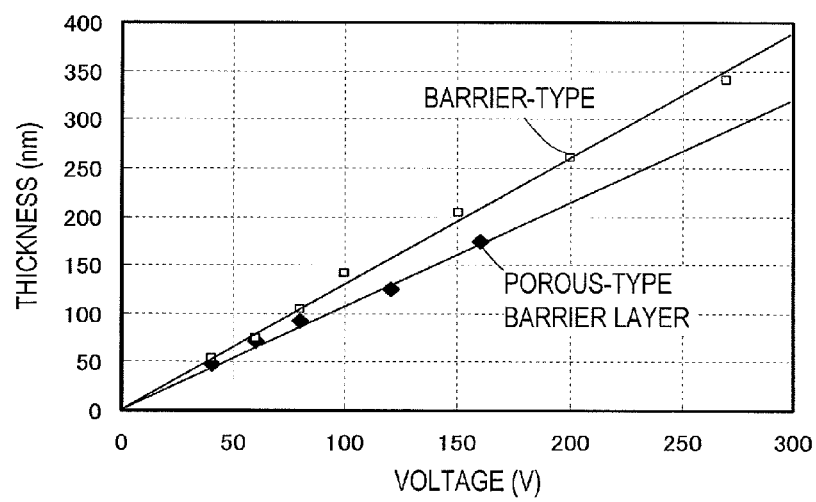
FIG. 2A A graph which represents the relationship between the applied voltage and the thickness of the barrier-type alumina layer (□) and a graph which represents the relationship between the applied voltage and the thickness of the barrier layer (♦).
Figure 2B:
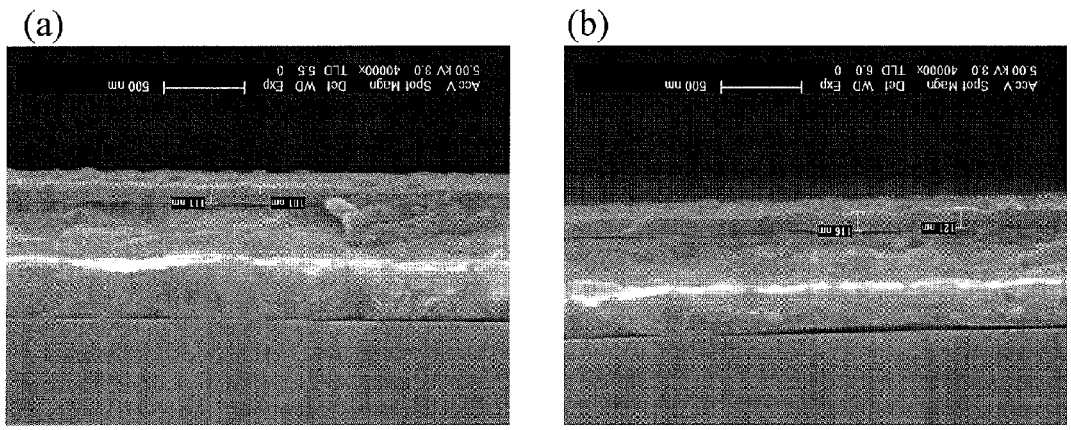
FIG. 2B (a) and (b) are cross-sectional SEM images of barrier-type alumina layers formed with the applied voltages of 80 V and 100 V, respectively.

FIG. 2A shows a graph in which the thickness of barrier-type alumina layers which were obtained by anodizing a 1 μm thick aluminum film deposited by sputtering on a glass substrate with the use of ammonium tartrate (solution temperature 5° C., concentration 0.1 mol/L (liter)) is plotted (□). FIG. 2A shows the results obtained with applied voltages varied in the range of 40 V to 270 V. FIG. 2B shows an example of a cross-sectional SEM image of the barrier-type alumina layer. FIGS. 2B(a) and 2B(b) are cross-sectional SEM images of barrier-type alumina layers formed with applied voltages of 80 V and 100 V, respectively. Note that the thickness of the barrier-type alumina layer plotted in FIG. 2A was obtained from the cross-sectional SEM image.

As seen from FIG. 2A, when the applied voltage was in the range of 40 V to 270 V, barrier-type alumina layers having thicknesses of about 50 nm to 340 nm were formed. The thickness of the barrier-type alumina layer was generally proportional to the applied voltage (proportionality constant: about 1.3 nm/V). It is said that the limit of the applied voltage for formation of a barrier-type alumina layer is 500 V to 700 V. This is because, if the applied voltage is excessively high, dielectric breakdown may occur.

As seen from the cross-sectional SEM image of FIG. 2B, the barrier-type alumina layer is formed over the surface of the aluminum film (over the surfaces of the respective crystal grains) so as to have a generally uniform thickness.

The porous alumina layer is obtained by anodizing aluminum using, for example, an acidic electrolytic solution as described above. The porous alumina layer includes a porous layer 14a which has a plurality of micropores 14p and a barrier layer 14b formed at the bottoms of the micropores as schematically shown in FIG. 1(c). The acidic electrolytic solution used may be, for example, sulfuric acid, oxalic acid, chromium acid, or phosphoric acid.

In general, the mechanism through which a porous alumina layer is formed by anodization with a constant applied voltage is explained with the following four separate modes I to IV.

Mode I: In the early phase of the anodization, a thin barrier layer is formed on the aluminum surface. If the aluminum surface is smooth, a smooth, thin barrier layer is formed uniformly. The total electric current density monotonically decreases.

Mode II: In the process through which the thickness of the barrier layer increases, an uneven structure is formed in the surface due to volume expansion of the barrier layer. If the uneven structure is formed in the surface, the distribution of the intensity of an electric field applied to the barrier layer accordingly becomes nonuniform (at the same time, the distribution of the electric current density also becomes nonuniform). As a result, local dissolution occurs.

Mode III: In the recessed portions in which the electric field concentrates, the dissolving power of the electrolytic solution increases due to the electric field and/or a local temperature increase. so that micropores are formed. The bottom of the micropore has the shape of a bowl, so that the area of an interface at which dissolution occurs increases. As a result, the total electric current density increases.

Mode IV: Growth of some of the micropores stops, while the other micropores continue to grow. The number of micropores becomes constant, and the growth stably continues. The total electric current density decreases again. At this timing, the thickness of the barrier layer would not change. The thickness of the barrier layer depends on the applied voltage in the anodization.

Figure 2C:
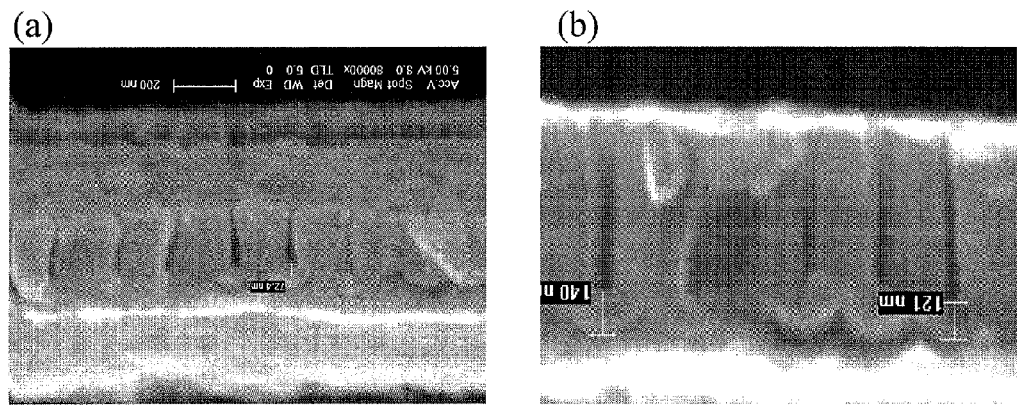
FIG. 2C (a) and (b) are cross-sectional SEM images of porous alumina layers formed with the applied voltages of 60 V and 120 V, respectively.

The present inventor prepared porous alumina layers by anodizing a 1 μm thick aluminum film, which was deposited on a glass substrate by sputtering, with the use of an oxalic acid aqueous solution (concentration 0.6 wt %, solution temperature 5° C.). FIG. 2A shows a graph in which the thickness of the barrier layers of the prepared porous alumina layers is plotted (♦). FIG. 2A shows the results obtained with varying applied voltages for the anodization in the range from 40 V to 160 V. Also, examples of cross-sectional SEM images of the porous alumina layers are shown in FIG. 2C. FIGS. 2C(a) and 2C(b) show cross-sectional SEM images of porous alumina layers with the applied voltages of 60 V and 120 V, respectively. Note that the thickness of the barrier layer was obtained from the cross-sectional SEM images.

As seen from FIG. 2A, in the range of the applied voltage from 40 V to 160 V, a barrier layer which had a thickness of about 50 nm to 170 nm was formed. The thickness of the barrier layer was generally proportional to the applied voltage (proportionality constant: about 1.07 nm/V). Note that, when a DC voltage of higher than 160 V was applied, a dielectric breakdown occurred.

It is known that the magnitude of the interpore distance in a porous alumina layer which is obtained as a result of a stable micropore growing process depends on the magnitude of the applied voltage. In that case, the interpore distance $D_{int}$ is expressed by the sum of the entire thickness of the pore walls, 2a, and the pore diameter, $D_p$ (see FIG. 1(c). Note that the thickness of the pore wall is equal to the thickness of the barrier layer, a, and therefore, the entire thickness of the pore wall that intervenes between two micropores is represented by the entire thickness, 2a.) Note that $D_p$ is smaller than 2a, and therefore, it is approximately estimated that $D_{int}$=2a.

However, in porous alumina layers which correspond to the respective points (♦) plotted in FIG. 2A, the interpore distance $D_{int}$ and the applied voltage did not satisfy the above-described relationship. Specifically, the interpore distance $D_{int}$ was not proportional to the applied voltage and did not exceed a predetermined value, although the thickness of the barrier layer was proportional to the applied voltage. As will be described later with experimental examples, when oxalic acid was used as the electrolytic solution, the surface of the aluminum film was anodized under the conditions from which formation of a porous alumina layer with an interpore distance of not less than 200 nm was expected in view of the above-described relationship, but the resultant interpore distance did not exceed about 180 nm to 190 nm. For example, as seen from the SEM images of the porous alumina layers of Comparative Examples 1 and 2 shown in FIG. 6, the black spots, corresponding to micropores, were formed at positions corresponding to boundaries (grain boundaries) of crystal grains that form the aluminum film. Note that the aluminum film deposited on the substrate was an aggregate of crystal grains. The average grain diameter of the crystal grains was approximately 180 nm to 190 nm.

It was found that the interpore distance of the porous alumina layer obtained by anodizing the surface of the aluminum film as described above is restricted by the grain diameter of the crystal grains that form the aluminum film. The reasons for this are described below.

The grain boundaries in the aluminum film form recessed portions at the film surface. Therefore, a surface of the barrier layer formed in Mode I and Mode II which have previously been described also has recessed portions at the positions corresponding to the grain boundaries. As a result of concentration of the electric field, micropores grow preferentially at the positions corresponding to the grain boundaries. Thereafter, even if the anodization advances, preferential dissolution continues to advance in the micropores formed at the positions corresponding to the grain boundaries.

Specifically, when a flat surface of aluminum is anodized, the barrier layer grows till it has recessed portions which can cause concentration of the electric field such that local dissolution occurs, before the process transitions to Mode III. On the other hand, however, when an aluminum film which has grain boundaries is anodized, concentration of the electric field occurs in recessed portions that are attributed to the grain boundaries, and the process transitions to Mode III. Therefore, the thickness of the barrier layer in transition to Mode III (sometimes referred to as "$t_{b1}$") is smaller in the case of the aluminum film with grain boundaries than in the case of an aluminum material with a flat surface.

The interpore distance which is restricted by the grain boundaries may vary depending on the type of the electrolytic solution. As a result of experiments, when oxalic acid was used, the interpore distance was generally corresponding to the average grain diameter. When tartaric acid was used, however, the interpore distance was restricted to a value which was generally twice the average grain diameter. This is because the power to dissolve alumina varies depending on the type of the electrolytic solution.

The present inventor acquired the knowledge that, by forming a barrier-type alumina layer 12 prior to the anodization that is performed for the purpose of forming the porous alumina layer on the surface of the aluminum film, the interpore distance is prevented from being restricted by the diameter of crystal grains that form the aluminum film, and reached the concept of the present invention. Hereinafter, a method of forming an anodized layer according to an embodiment of the present invention is described in detail with reference to FIGS. 1(a) to 1(c).

Firstly, as shown in FIG. 1(a), an aluminum base 10 which includes an aluminum film 18 deposited on a glass substrate 16, for example, is provided. The aluminum film 18 is formed by means of vacuum evaporation or sputtering, for example. The thickness of the aluminum film 18 is, for example, 1 μm. The average grain diameter of crystal grains that form the aluminum film 18 may be approximately 180 nm to 190 nm.

Then, as shown in FIG. 1(b), the surface of the aluminum base 10 (the surface 18s of the aluminum film 18) is anodized, whereby a barrier-type alumina layer 12 is formed. The electrolytic solution used may be, for example, a neutral electrolytic solution (with pH of more than 3.0 and less than 8.0). The neutral electrolytic solution may preferably be an aqueous solution containing at least one of the acids or salts selected from the group consisting of ammonium tartrate, potassium sodium tartrate, boric acid, ammonium borate, ammonium oxalate, ammonium citrate, maleic acid, malonic acid, phthalic acid, and citric acid. For example, as in Inventive Example 1 which will be described later, the anodization is performed with the applied voltage of 80 V for 2 minutes using an aqueous solution of pH 6.5 which is at the solution temperature of 23° C. and which contains ammonium tartrate at the concentration of 0.1 mol/L, whereby a barrier-type alumina layer 12 with a thickness of about 100 nm can be formed. The thickness of the barrier-type alumina layer 12 may be altered by modifying the magnitude of the applied voltage as described above.

The thickness of the barrier-type alumina layer 12 may be appropriately determined according to an intended interpore distance as will be described later with experimental examples. By forming the barrier-type alumina layer, the interpore distance of the porous alumina layer that is formed after the formation of the barrier-type alumina layer is prevented from being restricted by the crystal grain diameter. Also, by modifying the thickness of the barrier-type alumina layer 12, the interpore distance of the porous alumina layer can be adjusted.

Then, as shown in FIG. 1(c), the aluminum film 18 is further anodized, whereby a porous alumina layer 14 which has a plurality of micropores 14p is formed. The electrolytic solution may be an aqueous solution which contains, for example, an acid selected from the group consisting of oxalic acid, tartaric acid, phosphoric acid, chromic acid, citric acid, and malic acid. The type of the electrolytic solution and the applied voltage affect the interpore distance of the porous alumina layer.

In the example illustrated in FIG. 1(c), for the sake of easy understanding, $D_{int}=T_w=2a$ holds true, where a is the thickness of the barrier layer, $D_{int}$ is the interpore distance, and $T_w$ is the thickness of the pore wall. As will be described later in the inventive examples, in a porous alumina layer which is obtained according to the anodized layer formation method of the present invention, $D_{int}=2a$ does not necessarily hold true.

For example, as in Inventive Example 1 which will be described later, after the formation of the above-described barrier-type alumina layer 12 that has a thickness of about 100 nm, the anodization is performed with an applied pulse voltage (amplitude 150 V, pulse width 10 msec, pulse interval 1 sec) for 2 minutes using an oxalic acid aqueous solution (concentration 0.6 wt %, solution temperature 5° C.), whereby a porous alumina layer 14 whose average interpore distance is 216.5 nm is obtained. Note that the thickness of the porous alumina layer may be appropriately changed. The aluminum film 18 may be entirely anodized.

Now, the function and the effects of the barrier-type alumina layer are described. The description provided below is a consideration based on the facts that were experimentally confirmed by the present inventor, which is provided for aid in understanding the present invention and to which the present invention is not limited.

As previously described with reference to the cross-sectional SEM image of FIG. 2B, the barrier-type alumina layer is formed over the surface of the aluminum film (the surfaces of the respective crystal grains) so as to have a generally uniform thickness.

Thereafter, the anodization is performed under the conditions determined for formation of a porous alumina layer. The conditions employed in this step are such that the thickness a of a barrier layer 14b included in a porous alumina layer 14 which is to be formed in this step is greater than the thickness of the barrier-type alumina layer which has already been formed. If the conditions employed in this step were such that the thickness a of the barrier layer 14b included in the porous alumina layer 14 which is to be formed in this step is smaller than the thickness of the barrier-type alumina layer which has already been formed, the anodization would not advance. This is because the electric current is not sufficiently supplied to the aluminum film.

As understood from the above, the interpore distance of the porous alumina layer that is formed after the formation of the barrier-type alumina layer is greater than the interpore distance of a porous alumina layer which includes a barrier layer whose thickness is equal to that of the barrier-type alumina layer. Furthermore, since the interpore distance of the porous alumina layer is proportional to the applied voltage, the interpore distance increases as the applied voltage increases.

Here, the aluminum film was anodized under such conditions that a porous alumina layer may be formed without formation of the barrier-type alumina layer. The applied voltage was increased so as to exceed a predetermined value, but the interpore distance of the formed porous alumina layer was restricted by the crystal grain diameter. This is because, in Mode II which has previously been described, the electric field concentrates in recessed portions of the barrier layer which are formed at the positions corresponding to the grain boundaries.

On the other hand, in the anodized layer formation method according to an embodiment of the present invention, at the timing of performing the anodization for formation of the porous alumina layer, a barrier-type alumina layer has already been formed to a predetermined thickness or greater (here, 100 nm). See FIG. 2B. Therefore, it is inferred that the degree of concentration of the electric field in the recessed portions of the barrier-type alumina layer which are formed at the positions corresponding to the grain boundaries of the aluminum film is smaller than the degree of concentration of the electric field in the recessed portions of the barrier layer in Mode II in the case where a porous alumina layer is directly formed over the surface of the aluminum film (in the barrier-type alumina layer, the recessed portions have a smaller curvature and a greater thickness), and the processes of Mode III and Mode IV advance through a mechanism which satisfies the above-described relationship between the applied voltage and the interpore distance. Note that, even when a barrier-type alumina layer is formed beforehand, the electric field concentrates in recessed portions in the process of forming a porous alumina layer, and therefore, micropores are readily formed at the positions corresponding to the grain boundaries. The interpore distance increases depending on the thickness of the barrier-type alumina layer which has been formed beforehand.

According to the anodized layer formation method of the embodiment of the present invention, the porous alumina layer is formed after the barrier-type alumina layer has been formed. Therefore, the interpore distance of the porous alumina layer can be controlled without being restricted by the crystal grain diameter of the aluminum film. The interpore distance of the porous alumina layer can also be controlled not only by modifying the magnitude of the applied voltage in formation of the porous alumina layer but also by regulating the thickness of the barrier-type alumina layer that is formed beforehand. In other words, the interpore distance of an anodized layer that is to be finally obtained by the anodized layer formation method of the embodiment of the present invention (i.e., porous alumina layer) does not satisfy, in general, the above-described relationship with the voltage which is applied in the step of forming the porous alumina layer, and also, does not satisfy in general the above-described relationship with the thickness of the barrier layer (note that the barrier-type alumina layer that is formed beforehand is included in the barrier layer of the porous alumina layer that is to be finally obtained).

Now, a preferred voltage application method in the step of forming the porous alumina layer is described.

Figure 3:
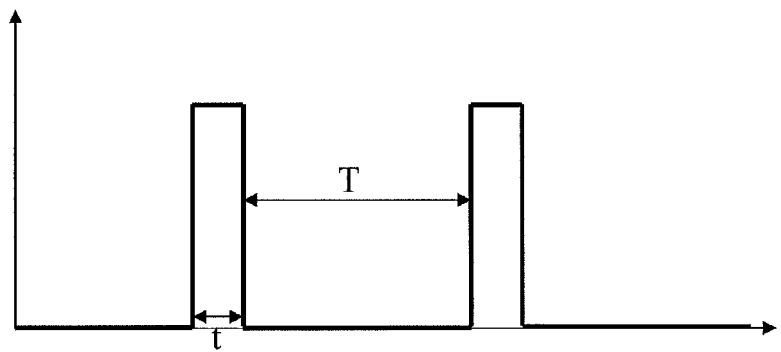
FIG. 3 A schematic diagram showing a pulse voltage.

The anodization step for formation of the porous alumina layer is preferably performed with application of a pulse voltage which is schematically shown in FIG. 3. By applying a pulse voltage, occurrence of breakage (a conduction failure which interrupts a current flow through an aluminum film), which will be described below, can be prevented. To increase the interpore distance of the porous alumina layer, it is necessary to increase the applied voltage, and therefore, it is necessary to prevent occurrence of breakage. The present inventor carried out the anodization with an applied voltage of 200 V according to a direct current anodizing method under two different conditions as schematically shown in FIGS. 4(a) and 4(b) and detected occurrence of breakage.

Figure 4:
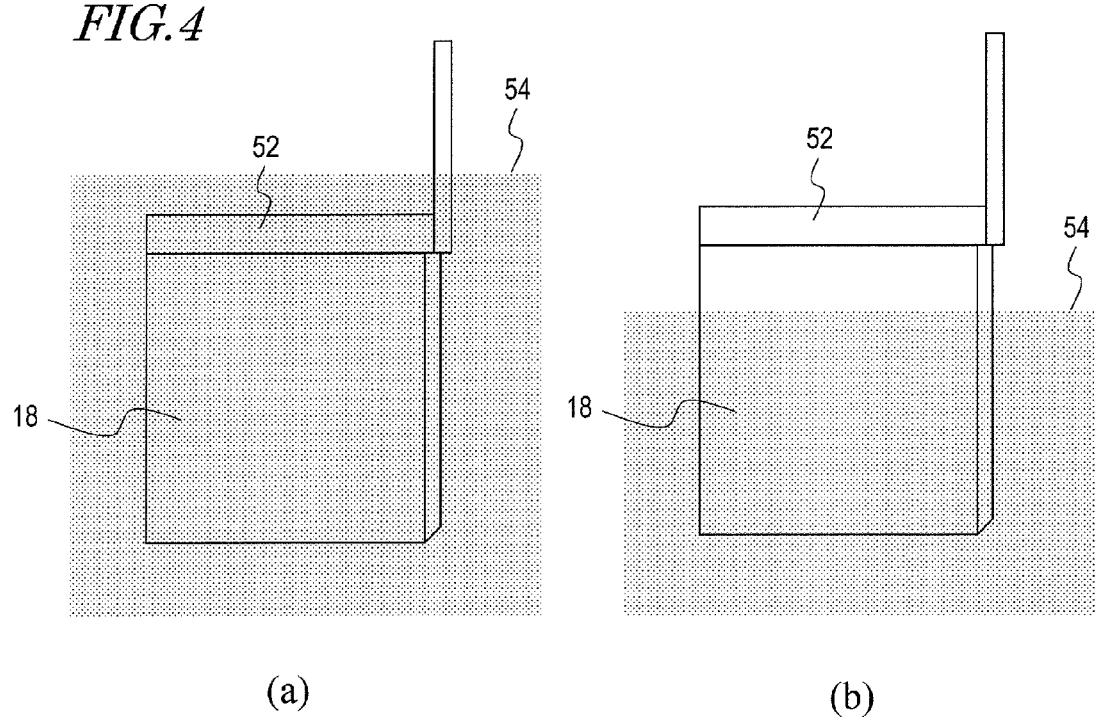
FIG. 4 (a) and (b) are schematic diagrams respectively showing a case where the anodization was performed with an aluminum film and an electrode being in contact with each other in an electrolytic solution and a case where the anodization was performed with an aluminum film and an electrode being in contact with each other outside an electrolytic solution.
Figure 5:
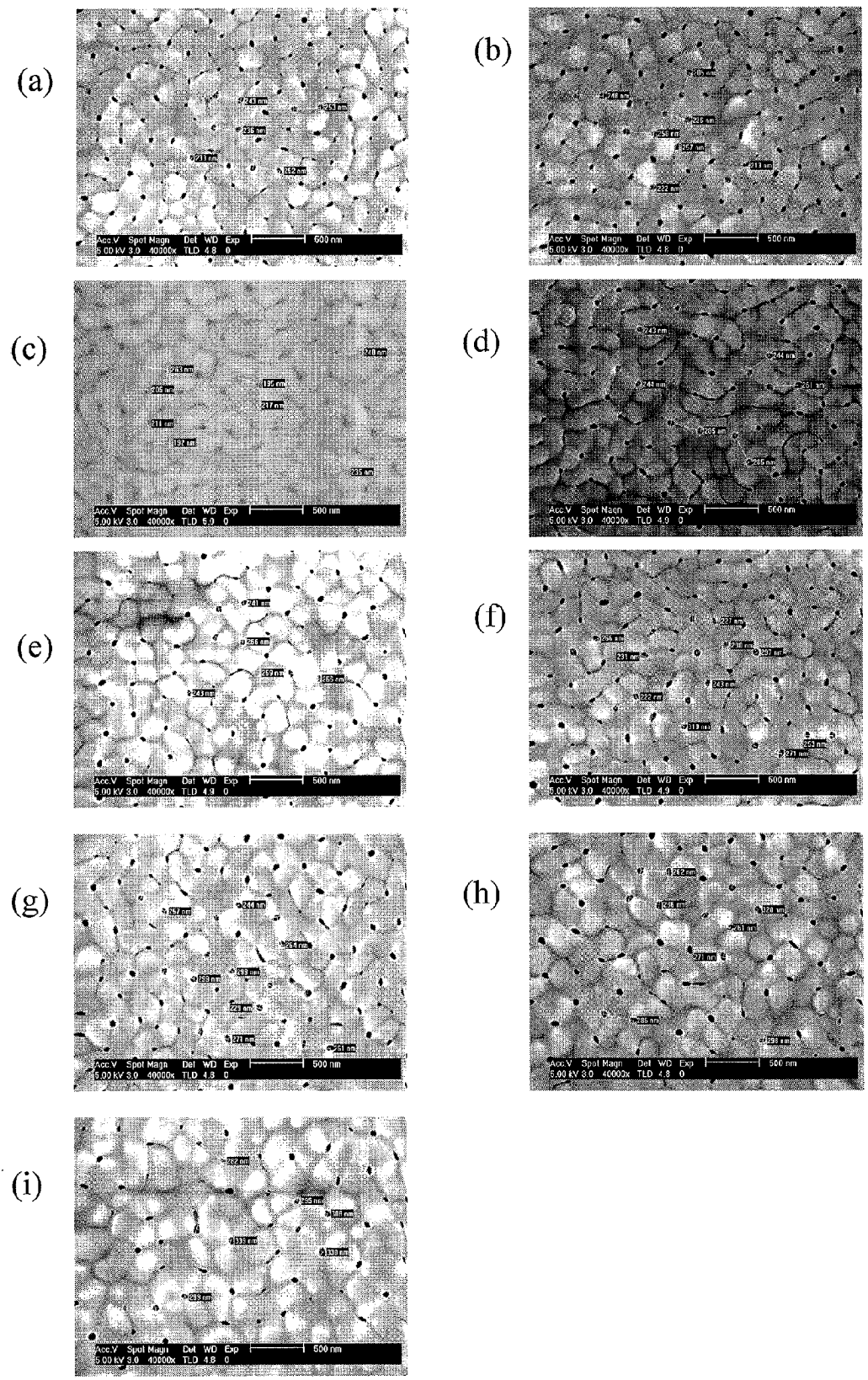
FIG. 5 (a) to (i) show SEM images of the surfaces of the porous alumina layers of Inventive Examples 1 to 9.
Figure 7:
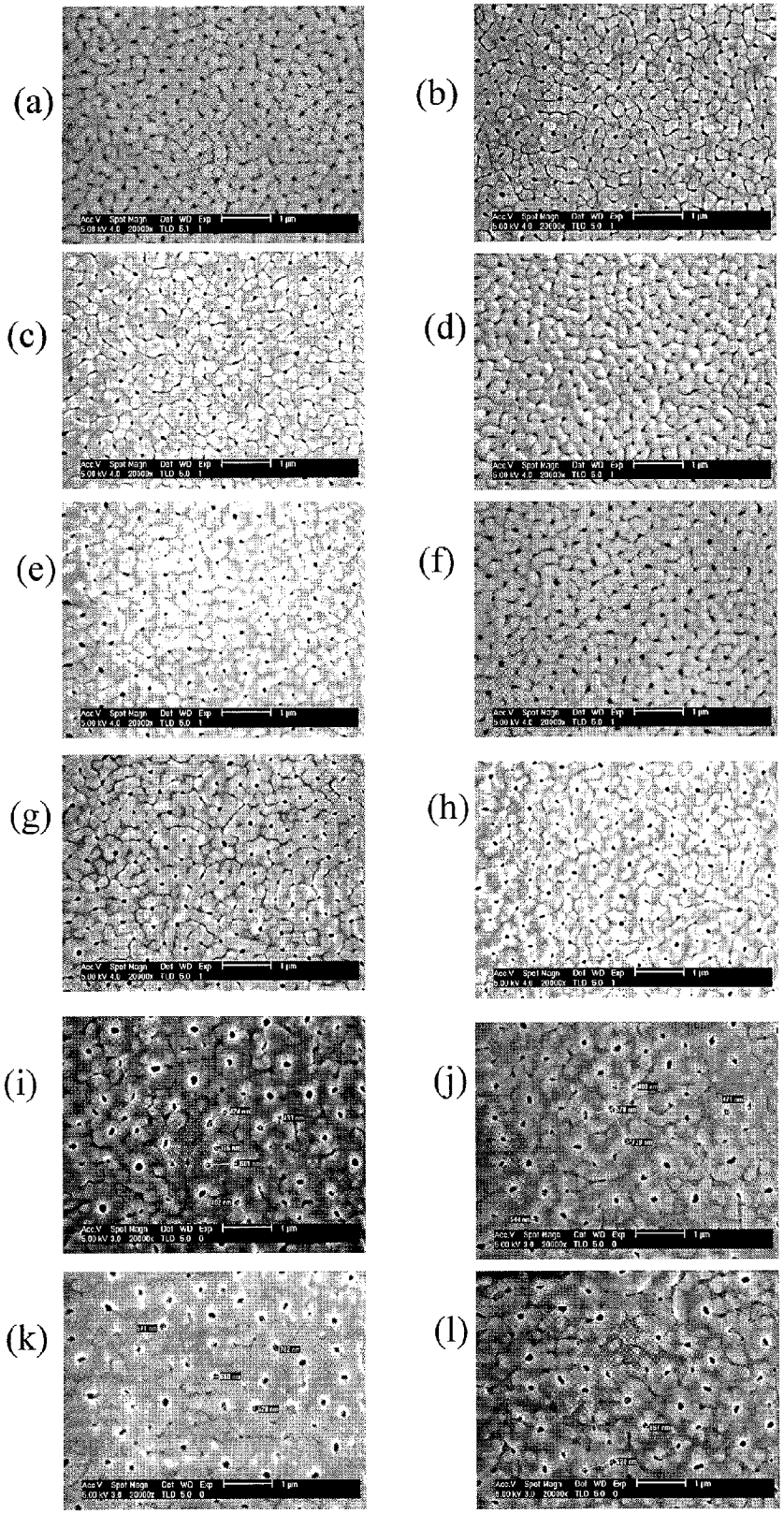
FIG. 7 (a) to (l) show SEM images of the surfaces of the porous alumina layers of Inventive Examples 10 to 21.

FIG. 4(a) is a diagram showing a case where the anodization was performed with the aluminum film 18 and the electrode 52 being in contact with each other in an electrolytic solution. FIG. 4(b) is a diagram showing a case where the anodization was performed with the aluminum film 18 and the electrode 52 being in contact with each other outside an electrolytic solution. In each case, the anodization was carried out using a 0.6 wt % oxalic acid aqueous solution at the solution temperature of 5° C. with an applied voltage of 200 V. The electrode 52 used was aluminum foil.

When the anodization was performed with the aluminum film 18 and the electrode 52 being in contact with each other in the electrolytic solution (FIG. 4(a)), breakage occurred at the interface between the aluminum film 18 and the electrode 52. At the interface, the current density is high so that the anodization advances faster. If the current density is high, a large amount of Joule's heat is generated. Therefore, the anodization reaction is further enhanced. As a result, it is inferred that, part of the aluminum film at the interface and in the vicinity of the interface was oxidized in the thickness direction faster than the other part of the aluminum film, and breakage occurred in this part.

When the anodization was performed with the aluminum film 18 and the electrode 52 being in contact with each other outside the electrolytic solution (FIG. 4(b)), breakage occurred at the liquid surface 54 of the electrolytic solution. At the liquid surface 54, the current density is high so that the anodization advances faster. When the current density is high, a large amount of Joule's heat is generated, so that the anodization reaction is further enhanced. As a result, it is inferred that, part of the aluminum film at the liquid surface 54 of the electrolytic solution and in the vicinity of the liquid surface 54 was oxidized in the thickness direction faster than the other part of the aluminum film, and breakage occurred in this part.

In each of the anodization processes which were performed under the above-described two conditions, breakage occurred, and accordingly, the anodization was interrupted, so that the surface of the aluminum film was not entirely anodized.

By applying the pulse voltage schematically shown in FIG. 3, the increase of the current density can be hindered. Also, by applying the pulse voltage, generation of Joule's heat is allowed to occur intermittently. Thus, the advancement of the anodization at the above-described interface or liquid surface can be delayed, so that occurrence of breakage can be prevented. By using the pulse voltage, the entire surface of the aluminum film 18 was successfully anodized with an applied voltage in the amplitude (peak value) range of not less than 40 V and not more than 400 V, without occurrence of breakage.

As shown in FIG. 3 where t is the pulse width of the pulse voltage and T is the pulse interval, when the step of forming the porous alumina layer is performed using an oxalic acid aqueous solution, it is preferred that the pulse width t is not more than 200 msec, and the pulse interval T is not less than 800 msec. This is because, when the pulse width t was greater than 200 msec and the pulse interval T was smaller than 800 msec, breakage occurred. Note that, for example, a tartaric acid aqueous solution has a relatively small dissolving power, and therefore, a pulse voltage may not be used when the anodization is performed using the tartaric acid aqueous solution. In the anodization which was performed using a tartaric acid aqueous solution such as in Inventive Examples 10 to 21 which will be described later, a DC voltage was applied, but breakage did not occur.

In general, when the dissolving power of the electrolytic solution is small, a barrier-type alumina layer is formed. If the dissolving power of the electrolytic solution is large, a porous alumina layer is formed. Some of the aforementioned electrolytic solution examples used in the anodization step for formation of the porous alumina layer 14 may be converted into the electrolytic solution for use in the anodization step for formation of the barrier-type alumina layer 12 by appropriately modifying the concentration, the temperature, and/or the applied voltage. For example, the barrier-type alumina layer 12 can be formed by performing the anodization with a decreased solution temperature and/or decreased concentration, or performing the anodization with a decreased dissolving power by applying a pulse voltage. For example, when the anodization was performed using a phosphoric acid aqueous solution at a concentration of 1 mol/L and a solution temperature of 5° C. with an applied voltage of 80 V, a porous alumina layer was formed. When the anodization was performed using phosphoric acid at a concentration of 0.01 mol/L and a solution temperature of 5° C. with an applied voltage of 80 V or 100 V, a barrier-type alumina layer was formed. When the anodization was performed using citric acid at a concentration of 1 wt % or 2 wt % and a solution temperature of 5° C. with an applied voltage of 380 V, a porous alumina layer was formed. When the anodization was performed using citric acid at a concentration of 1 wt % or 2 wt % and a solution temperature of 5° C. with an applied voltage of 200 V, a barrier-type alumina layer was formed. The aforementioned electrolytic solution examples used in the step of forming the barrier-type alumina layer may be converted into the electrolytic solution for use in the anodization step for formation of the porous alumina layer by appropriately modifying the concentration, the temperature, and/or the applied voltage.

Hereinafter, a method of forming an anodized layer according to an embodiment of the present invention is described in more detail while comparing inventive examples and comparative examples.

INVENTIVE EXAMPLES 1 to 9

Comparative Examples 1 and 2

Each of the porous alumina layers of Inventive Examples 1 to 9 was formed by performing the anodization with the use of an ammonium tartrate aqueous solution (which is referred to as "first anodization cycle") to form a barrier-type alumina layer and thereafter performing the anodization with the use of an oxalic acid aqueous solution (which is referred to as "second anodization cycle"). Inventive Examples 1 to 9 are different in the voltage applied in the first anodization cycle, the voltage applied in the second anodization cycle, and the duration of the voltage application in the second anodization cycle (the values of the applied voltage are shown in Table 1), while the other conditions (the aluminum base used, the electrolytic solutions used in the first and second anodization cycles) were the same.

The aluminum base 10 (FIG. 1(a)) used was prepared by forming an aluminum film 18 to 1 μm thick by sputtering on a square glass substrate 16 of 5 cm on each side (0.7 mm thick). Note that the formation of the aluminum film 18 was interrupted every time a 200 nm thick aluminum layer was formed, so that the aluminum film 18 was realized by 5 aluminum layers each of which had a thickness of 200 nm. At the surface of the aluminum film 18, there were crystal grains whose size was about 180 nm to 190 nm.

In the first anodization cycle, the surface 18s of the aluminum base 10 was anodized for 2 minutes with the use of ammonium tartrate (concentration 0.1 mol/L, pH 6.5, solution temperature 23° C.), whereby the barrier-type alumina layer 12 was formed. The applied voltage was any of 80 V, 100 V, 120 V, 150 V, and 180 V shown in Table 1, which was applied according to a direct current anodizing method.

In the second anodization cycle, the anodization was performed with the use of oxalic acid (pH 6.5, concentration 0.6 wt %, solution temperature 5° C.), whereby the porous alumina layer 14 was formed. The applied voltage was a pulse voltage such that the amplitude was any of 150 V, 200 V, and 300 V shown in Table 1, the pulse width t was 10 msec, and the pulse interval T was 1 sec. The reason why the pulse voltage was applied is to prevent occurrence of breakage as described above. The anodization was continued till aluminum completely changed into alumina. In Inventive Examples 1 to 9, the duration of the second anodization cycle was in the range of 1 min to 30 min.

SEM images of the surfaces of the porous alumina layers of Inventive Examples 1 to 9 are shown in FIGS. 5(a) to 5(i). For all the micropores in the regions shown in FIGS. 5(a) to 5(i) (3 μm×2.3 μm (=6.9 μm$^2$)), the distances from each of the micropores to the first to third closest micropores (interpore distances) were measured. The average values of the interpore distance calculated from the measured interpore distances are shown in Table 1. Also, the standard deviation of the interpore distance was obtained. In each of Comparative Examples 1 and 2 and Inventive Examples 1 to 9, the standard deviation was about 30% of the average value. That is, the difference in the distribution of the interpore distance was not large among these examples. Table 1 also shows the thickness of the barrier-type alumina layer formed in the first anodization cycle and the thickness of the barrier layer of the porous alumina layer formed in the second anodization cycle. Note that, in Inventive Examples 1 and 3, a single piece of the aluminum base was subjected to the first anodization cycle at 80 V, and thereafter, the resultant aluminum base was divided into two pieces, which were then subjected to the second anodization cycle, one with an applied voltage of 150 V and the other with an applied voltage of 200 V. Thus, the barrier-type alumina layers of Inventive Examples 1 and 3 had equal thicknesses. Also in Inventive Examples 2, 4, and 6 and Inventive Examples 5 and 7, likewise, a single piece of the aluminum base was subjected to the first anodization cycle and thereafter divided into two pieces, which were then subjected to the second anodization cycle.

TABLE 1

| Inventive Example | 1 | 2 | 3 | 4 | 5 | 6 | 7 | 8 | 9 |
|---|---|---|---|---|---|---|---|---|---|
| Applied voltage of 1st anodization cycle (V) | 80 | 100 | 80 | 100 | 120 | 100 | 120 | 150 | 180 |
| Duration of 1st anodization cycle (sec) | 120 | 120 | 120 | 120 | 120 | 120 | 120 | 120 | 120 |
| Applied voltage of 2nd anodization cycle (V) | 150 | 150 | 200 | 200 | 200 | 300 | 300 | 300 | 300 |
| Thickness of barrier-type alumina layer (nm) | 104 | 142 | 104 | 142 | 157 | 142 | 157 | 203 | 230 |

TABLE 1-continued

| Inventive Example | 1 | 2 | 3 | 4 | 5 | 6 | 7 | 8 | 9 |
|---|---|---|---|---|---|---|---|---|---|
| Thickness of barrier layer (nm) | 165 | 158 | 208 | 211 | 216 | 313 | 308 | 318 | 310 |
| Average value of interpore distance (nm) | 216.5 | 240.3 | 238.4 | 246.2 | 271.7 | 253.0 | 259.4 | 296.5 | 337.0 |

The porous alumina layers of Comparative Examples 1 and 2 were formed under the same conditions as those of Inventive Examples 3 to 5 and Inventive Examples 6 to 9, respectively, except that the first anodization cycle was omitted. In other words, the porous alumina layers of Comparative Examples 1 and 2 were formed without formation of the barrier-type alumina layer. The porous alumina layers of Comparative Examples 1 and 2 were formed by anodizing the surface of the same aluminum base as that used for Inventive Examples 1 to 9, under the conditions that the applied voltage was a pulse voltage with amplitudes of 200 V and 300 V, the pulse width t of 10 msec, and the pulse interval T of 1 sec, with the use of oxalic acid (concentration 0.6 wt %, solution temperature 5° C.), till aluminum completely changed into alumina. SEM images of the surfaces of the porous alumina layers of Comparative Examples 1 and 2 are shown in FIGS. 6(a) and 6(b). The average values of the interpore distance which were obtained from the SEM images of FIGS. 6(a) and 6(b) in the same way as those shown in Table 1 are shown in Table 2.

TABLE 2

| Comparative Example | 1 | 2 |
|---|---|---|
| Amplitude of applied voltage of anodization (V) | 200 | 300 |
| Duration of anodization (sec) | 16 | 5 |
| Thickness of barrier layer (nm) | 211 | 313 |
| Average value of interpore distance (nm) | 190.2 | 187.8 |

As seen from FIGS. 5(a) to 5(i) and FIGS. 6(a) and 6(b), in each of Inventive Examples 1 to 9 and Comparative Examples 1 and 2, a porous alumina layer which has a plurality of micropores formed over its entire surface was obtained. Comparing FIGS. 5(a) to 5(i) and FIGS. 6(a) and 6(b), it is seen that the porous alumina layers of Inventive Examples 1 to 9 had a smaller number of micropores and accordingly a greater interpore distance. In each of Inventive Examples 1 to 9 (Table 1), the average value of the interpore distance was not less than 200 nm. On the other hand, in Comparative Examples 1 and 2 (Table 2), the average values of the interpore distance were 190.2 nm and 187.8 nm, respectively. Thus, in Inventive Examples 1 to 9, a porous alumina layer which had a large interpore distance was formed as compared with Comparative Examples 1 and 2.

Thus, the interpore distance of the porous alumina layers of Comparative Examples 1 and 2 was restricted by the grain diameter of the crystal grains that formed the aluminum film (180 nm to 190 nm), whereas in the cases of the porous alumina layers of Inventive Examples 1 to 9, the barrier-type alumina layer was formed, which is the reason that the interpore distance was not restricted by the grain diameter of the crystal grains that formed the aluminum film. As the applied voltage of the second anodization cycle increased, the resultant porous alumina layer had a greater interpore distance.

Comparing Examples 3, 4, and 5 among which the applied voltage of the second anodization cycle is equal, as the applied voltage of the first anodization cycle (the anodization for formation of the barrier-type alumina layer) increased, i.e., as the thickness of the barrier-type alumina layer formed in the first anodization cycle increased, the interpore distance of the porous alumina layer formed in the second anodization cycle increased (Table 1). Also in the cases of Inventive Examples 1 and 2 and Inventive Examples 6 to 9, as the applied voltage of the first anodization cycle increased, i.e., as the thickness of the barrier-type alumina layer formed in the first anodization cycle increased, the interpore distance increased (Table 1) as in the cases of Inventive Examples 3 to 5. The reason why the interpore distance of the porous alumina layer formed in the second anodization cycle increased as the thickness of the barrier-type alumina layer formed in the first anodization cycle increased, even though the applied voltage of the second anodization cycle was equal, will be described later.

As seen from Table 1, in Inventive Examples 1 to 9, the thickness of the barrier-type alumina layer generally had the proportional relationship with the applied voltage as previously described with reference to FIG. 2A. In each of Inventive Examples 1 to 9, the thickness of the barrier layer of the porous alumina layer increased as the applied voltage of the second anodization cycle increased. In each of Inventive Examples 1 to 9, the thickness of the barrier layer formed was greater than that of the barrier-type alumina layer. Note that, in Inventive Examples 1 to 9, the entire thickness of the porous alumina layer was about 1.2 μm.

INVENTIVE EXAMPLES 10 to 21

Comparative Examples 3 to 5

Each of the porous alumina layers of Inventive Examples 10 to 21 was formed by performing anodization with the use of an ammonium tartrate aqueous solution to form a barrier-type alumina layer and thereafter performing anodization with the use of a tartaric acid aqueous solution. Thus, Inventive Examples 10 to 21 are different from Inventive Examples 1 to 9 in the electrolytic solution used in the second anodization cycle. In Inventive Examples 10 to 21, the voltage applied in the first anodization cycle, the voltage applied in the second anodization cycle, and the duration of the voltage application in the second anodization cycle were different (the magnitude of the applied voltage and the duration of the voltage application are shown in Table 3 and Table 4), while the other conditions (the aluminum base used, the electrolytic solutions used in the first and second anodization cycles, and the duration of the first anodization cycle) were the same.

The aluminum base was the same as that used in Inventive Examples 1 to 9 which have previously been described.

In Inventive Examples 10 to 17, the surface 18s of the aluminum base 10 was anodized for 2 minutes with the use of an ammonium tartrate aqueous solution (concentration 0.1 mol/L, pH 6.5, solution temperature 23° C.), whereby the barrier-type alumina layer 12 was formed. The applied voltage was any of 100 V, 120 V, 150 V, 180 V, and 200V shown in Table 3, which was applied according to a direct current anodizing method. Then, the anodization was performed with the use of tartaric acid (pH 6.5, concentration 2 wt %, solution temperature 22° C.), whereby the porous alumina layer 14 was formed. The applied voltage was any of 200 V and 250V shown in Table 3, which was applied according to a direct current anodizing method. The anodization was continued till aluminum completely changed into alumina.

In Inventive Examples 18 to 21, the anodization was performed for 2 minutes (effective duration) with the use of an ammonium tartrate aqueous solution with the concentration of 0.001 mol/L, pH 6.5, and the solution temperature at 23° C., whereby the barrier-type alumina layer 12 was formed. The applied voltage was a pulse voltage. The amplitude of the pulse voltage was any of 280 V, 300 V, 330 V, and 350 V shown in Table 4, the pulse width t was 100 msec, and the pulse interval T was 900 msec. By applying such a pulse voltage for 20 minutes, the anodization was performed for 2 minutes (effective duration). Then, the anodization was performed for 30 sec with the applied voltage of 380 V with the use of tartaric acid (pH 6.5, concentration 2 wt %, solution temperature 22° C.), whereby the porous alumina layer 14 was formed. The reason why the pulse voltage was applied in the first anodization cycle in Inventive Examples 18 to 21 is that, if the anodization was performed using an ammonium tartrate aqueous solution with a high applied voltage of not less than 280 V according to a direct current anodizing method, micropores would sometimes be formed in some portions.

SEM images of the surfaces of the porous alumina layers of Inventive Examples 10 to 21 are shown in FIGS. 7(a) to 7(l). As in Table 1, the average values of the interpore distance obtained from the SEM images of FIGS. 7(a) to 7(l) (6 μm×4.6 μm (=27.6 μm²)) are shown in Tables 3 and 4.

TABLE 3

| Inventive Example | 10 | 11 | 12 | 13 | 14 | 15 | 16 | 17 |
|---|---|---|---|---|---|---|---|---|
| Applied voltage of 1st anodization cycle (V) | 100 | 120 | 150 | 180 | 120 | 150 | 180 | 200 |
| Duration of 1st anodization cycle (sec) | 120 | 120 | 120 | 120 | 120 | 120 | 120 | 120 |
| Applied voltage of 2nd anodization cycle (V) | 200 | 200 | 200 | 200 | 250 | 250 | 250 | 250 |
| Duration of 2nd anodization cycle (sec) | 600 | 600 | 600 | 600 | 240 | 240 | 240 | 240 |
| Thickness of barrier-type alumina layer (nm) | 142 | 157 | 203 | 230 | 157 | 203 | 230 | 260 |
| Average value of interpore distance (nm) | 306.5 | 316.8 | 319.3 | 325.8 | 371.4 | 388.5 | 405.8 | 440.7 |

TABLE 4

| Inventive Example | 18 | 19 | 20 | 21 |
|---|---|---|---|---|
| Amplitude of applied voltage of 1st anodization cycle (V) | 280 | 300 | 330 | 350 |
| Duration of 1st anodization cycle (sec) | 120 | 120 | 120 | 120 |
| Applied Voltage of 2nd anodization cycle (V) | 380 | 380 | 380 | 380 |
| Duration of 2nd anodization cycle (sec) | 30 | 30 | 30 | 30 |
| Thickness of barrier-type alumina layer (nm) | 320 | 340 | 360 | 380 |
| Average value of interpore distance (nm) | 586.7 | 671.1 | 699.2 | 723.3 |

The porous alumina layers of Comparative Examples 3, 4, and 5 were formed without performing the first anodization cycle of Inventive Examples 10 to 13, 14 to 17, and 18 to 21, respectively. The porous alumina layers of Comparative Examples 3, 4, and 5 were formed by anodizing the surface of the same aluminum base as that used in Inventive Examples 10 to 21, with the applied voltage of 200 V, 250 V, and 380 V, with the use of a tartaric acid aqueous solution (concentration 2 wt %, solution temperature 23° C.), till aluminum completely changed into alumina. SEM images of the surfaces of the porous alumina layers of Comparative Examples 3 to 5 are shown in FIGS. 8A(a) to 8A(c). The average values of the interpore distance obtained from the SEM images of FIGS. 8A(a) to 8A(c) in the same way as those of Table 1 are shown in Table 5. Note that the standard deviation of the interpore distance was obtained, and the distribution of the interpore distance was examined. The difference in the distribution of the interpore distance was not large between Comparative Examples 3 to 5 and Inventive Examples 10 to 21.

TABLE 5

| Comparative Example | 3 | 4 | 5 |
|---|---|---|---|
| Applied voltage of anodization (V) | 200 | 250 | 380 |
| Duration of anodization (sec) | 600 | 120 | 24 |
| Thickness of barrier layer (nm) | 256 | 270 | 367 |
| Average value of interpore distance (nm) | 295.8 | 340.9 | 375.9 |

As seen from FIG. 7 and FIGS. 8A to 8C and Tables 3 to 5, the interpore distances of the porous alumina layers of Inventive Examples 10 to 13, 14 to 17, and 18 to 21 (about 300 nm to about 720 nm) were respectively greater than the interpore distances of the porous alumina layers of Comparative Examples 3, 4, and 5 (about 300 nm to 380 nm) for which the applied voltages were equal in the anodization with the use of a tartaric acid aqueous solution.

Comparing Inventive Example 21 and Comparative Example 5 for which the voltage applied for formation of the porous alumina layer was highest (380 V), the interpore distance of the porous alumina layer of Inventive Example 21 was about 720 nm, whereas the interpore distance of the porous alumina layer of Comparative Example 5 was about 380 nm, which is a very small value. This is probably because, in Comparative Examples 3 to 5, as illustrated with an example in which oxalic acid was used, the interpore distance was restricted by the grain diameter of crystal grains that form the aluminum film. Note that, when the tartaric acid was used, the interpore distance was restricted to about twice the average grain diameter. The reason why the interpore distance obtained was greater than in the case where the oxalic acid was used is probably that the tartaric acid had a smaller power to dissolve alumina than the oxalic acid so that the density of formation of the micropores (the number of micropores per unit area) was small.

In Inventive Examples 10 to 21, the thickness of the barrier-type alumina layer had a proportional relationship with the applied voltage as previously described with reference to FIG. 2A. Thus, as the applied voltage of the first anodization cycle increased, the thickness of the barrier-type alumina layer also increased.

Comparing Inventive Examples 10, 11, 12, and 13, the interpore distance increased as the applied voltage of the first anodization cycle increased, i.e., as the thickness of the barrier-type alumina layer formed by the first anodization cycle increased. Also in the cases of Inventive Examples 14 to 17 and 18 to 21, the interpore distance increased as the applied voltage of the first anodization cycle increased and the thickness of the barrier-type alumina layer increased. It is inferred that, in the second anodization cycle, the operations of Mode III and Mode IV advance through a mechanism which satisfies the above-described relationship between the applied voltage and the thickness of the barrier layer. Thus, the interpore distance of the porous alumina layers of Inventive Examples 10 to 21 which were formed with the use of a tartaric acid aqueous solution exhibited similar tendencies to those of the porous alumina layers of Inventive Examples 1 to 9 which were formed with the use of an oxalic acid aqueous solution.

According to the researches conducted by the present inventor, the reason why the interpore distance of the porous alumina layer formed in the second anodization cycle increased as the thickness of the barrier-type alumina layer formed in the first anodization cycle increased can probably be explained below. Hereinafter, this reason will be described with reference to FIG. 8B and FIG. 8C.

FIG. 8B shows a graph which represents the relationship between the thickness and the average value of the interpore distance in the barrier-type alumina layers of Inventive Examples 1 to 9 shown in Table 1 (◆) and a graph which represents the relationship between the thickness and the interpore distance (average value) in the barrier-type alumina layers of Inventive Examples 10 to 21 shown in Tables 3 and 4 (□). FIG. 8B also shows the line of $D_{int}=2 \times t_B$ ($D_{int}$ is the interpore distance, and $t_B$ is the thickness of the barrier-type alumina layer). FIGS. 8C(a) to 8C(c) are schematic diagrams for illustrating Mode II and Mode III in the mechanism of formation of the porous alumina layer. FIGS. 8C(a) and 8C(b) illustrate the cases where the porous alumina layer is formed without formation of the barrier-type alumina layer. FIG. 8C(a) illustrates the case where the applied voltage is relatively low (e.g., 80 V). FIG. 8C(b) illustrates the case where the applied voltage is relatively high (e.g., 200 V). FIG. 8C(c) schematically illustrates the case where the porous alumina layer is formed with a relatively high applied voltage after formation of the barrier-type alumina layer. In each of FIGS. 8C(a) to 8C(c), parts (II) and (III) schematically illustrate Mode II and Mode III, respectively.

In the beginning, the differences between Mode II and Mode III in the cases where the anodization is performed without formation of the barrier-type alumina layer, which are attributed to the magnitude of the applied voltage, are described with reference to FIGS. 8C(a) and 8C(b). As described above, the porous alumina layer is formed through Modes I to IV which have previously been described. In Mode II, a thin barrier layer formed in Mode I undergoes volume expansion. The volume expansion causes formation of recessed portions and raised portions in the surface. The recessed and raised portions formed in the surface cause a nonuniform electric field intensity distribution. At the recessed portions in which the electric field concentrates, local dissolution occurs. In Mode III, micropores are formed at the recessed portions in which the local dissolution has occurred due to the electric field concentration. Hereinbelow, the thickness of the barrier layer which has undergone volume expansion in Mode II (the thickness of the barrier layer immediately before the beginning of local dissolution, i.e., the thickness of the barrier layer in transition to Mode III) is denoted by $t_{b1}$, the thickness of the barrier layer of the porous alumina layer formed in Mode III is denoted by $t_{b2}$, the thickness of the barrier-type alumina layer is denoted by $t_B$, the total thickness of the pore wall is denoted by $T_w$, the interpore distance is denoted by $D_{int}$, and the diameter of the micropore is denoted by $D_p$. Here, $D_{int}=T_w+D_p$ holds true. Note that, in the descriptions provided below, $D_p$ is smaller than each of $t_{b1}$, $t_{b2}$, $t_B$, $T_w$, and $D_{int}$. The interpore distance $D_{int}$ is generally equal to the total thickness of the pore wall, $T_w$. Here, $T_w$ is generally twice the thickness of the barrier layer in transition to Mode III, $t_{b1}$.

Now, consider a case where the anodization is performed with a relatively low voltage without formation of the barrier-type alumina layer. If the anodization is performed using, for example, an oxalic acid aqueous solution with an applied voltage of 80 V, the thickness of the barrier layer is about 90 nm as seen from FIG. 2A. In that case, the interpore distance $D_{int}$ is about 180 nm.

On the other hand, consider a case where the anodization is performed with a relatively high voltage without formation of the barrier-type alumina layer. When the anodization was performed using, for example, a tartaric acid aqueous solution with an applied voltage of 200 V, the interpore distance $D_{int}$ was about 300 nm (Comparative Example 3 shown in Table 5), which was smaller than the magnitude that was supposed to be achieved with that applied voltage (about 460 nm). As seen from FIG. 2A, when the anodization is performed with an applied voltage of 200 V, the thickness of the barrier layer is about 230 nm, and therefore, the magnitude of the interpore distance which is achieved in this case according to the applied voltage is about 230 nm×2=460 nm. Note that, in Comparative Example 3, the thickness of the barrier layer at the bottoms of the finally-obtained micropores ($t_{b2}$) was 256 nm, which was close to the thickness that was supposed to be achieved with that applied voltage (about 230 nm).

When the anodization is performed using an oxalic acid aqueous solution with an applied voltage of 80 V, the barrier layer grows to about 90 nm thick (i.e., the thickness which is determined depending on the applied voltage) in Mode II. Thereafter, the process transitions to Mode III where local dissolution begins, and the reaction progresses such that the interpore distance becomes about 180 nm, which is about twice the thickness of the barrier layer (about 90 nm). If the applied voltage is relatively low, the barrier layer grows so that recessed and raised portions are formed in the surface of the barrier layer, and local dissolution occurs in the recessed portions at the surface. And, the process transitions to Mode III. Since the thickness at which local dissolution occurs depends on the applied voltage, the thickness of the barrier layer $t_{b1}$ in transition to Mode III depends on the applied voltage. Thereafter, the micropores formed by local dissolution stably grow, and the thickness of the barrier layer $t_{b1}$ is maintained constant. As a result, the interpore distance $D_{int}$ of the porous alumina layer which is obtained when the applied voltage is relatively low satisfies the relationship of $D_{int}=2 \times t_{b1}=2 \times t_{b2}$ as schematically shown in FIG. 8C(a).

However, it is inferred that, when the anodization is performed using a tartaric acid aqueous solution with the applied voltage of 200 V, local dissolution occurs in recessed portions which are formed due to grain boundaries, and the process transitions to Mode III, before the barrier layer is grown to such a thickness that the surface of the barrier layer has recessed and raised portions in which local dissolution may occur (about 230 nm). Here, it is inferred that, the process transitioned to Mode III at the timing when the thickness of the barrier layer reached about 150 nm ($t_{b1}$=150 nm), and as a result, the resultant porous alumina layer had an interpore distance of about 300 nm ($2 \times t_{b1}$). Note that the barrier layer at the bottoms of the micropores of the finally-obtained porous alumina layer grows to a thickness corresponding to the applied voltage, $t_{b2}$. Therefore, the interpore distance of the porous alumina layer that is obtained when the applied voltage is relatively high, $D_{int}$, satisfies the relationship of $D_{int}=2 \times t_{b1}<2 \times t_{b2}$ as schematically shown in FIG. 8C(b).

Now, Inventive Examples 1 to 21, in which the porous alumina layer was formed after the barrier-type alumina layer has been formed, are described with reference to FIG. 8B. As seen from FIG. 8B, in Inventive Examples 1 to 21, $D_{int}=2 \times t_B$ generally holds true. Particularly in Inventive Examples 10 to 21 (□ in FIG. 8B), the results were approximate to $D_{int}=2 \times t_B$. Therefore, it is inferred that, in Inventive Examples 1 to 21, the thickness of the barrier layer in transition to Mode III, $t_{b1}$, was generally equal to the thickness of the barrier-type alumina layer, $t_B$, and that in Mode III the reaction progressed such that the interpore distance became $2 \times t_B$. Thus, when the porous alumina layer is formed after the barrier-type alumina layer has been formed, the relationships of $t_{b2} \geq t_{b1}$ and $D_{int}=2 \times t_{b1} \leq 2 \times t_{b2}$ hold true as schematically shown in FIG. 8C(c). The results of Inventive Examples 1 to 21 shown in Tables 1, 3, and 4 generally satisfy these relationships.

As seen from FIG. 8B, in Inventive Examples 1 to 21, as the thickness of the barrier-type alumina layer increased, the interpore distance $D_{int}$ also increased. As described above, it is inferred that, by forming a barrier-type alumina layer beforehand as in Inventive Examples 1 to 21, a barrier layer which has a thickness generally equal to the thickness of the barrier-type alumina layer, $t_B$, has been formed at the timing of transition to Mode III. Therefore, in Inventive Examples 1 to 21, $t_{b1}$ in the relationship of $D_{int}=2 \times t_{b1}+D_p$ shown above is equal to the thickness of the barrier-type alumina layer formed in the first anodization cycle, $t_B$. Thus, as the thickness of the barrier-type alumina layer formed in the first anodization cycle increases, $t_{b1}$ also increases. It is therefore inferred that, in the resultant porous alumina layer, $D_{int}$ ($=2 \times t_{b1}+D_p$) was large.

As seen from Tables 1, 3 and 4 and FIG. 8B, among some of the Inventive Examples in which the thickness of the barrier-type alumina layer was equal, the interpore distance $D_{int}$ was different, and the interpore distance $D_{int}$ increased as the applied voltage of the second anodization cycle increased. It is inferred that, as the applied voltage in the anodization step for formation of the porous alumina layer increased, the transition to Mode III was delayed longer, and as a result, $t_{b1}$ increased.

As described above, in the case where the anodization is performed without formation of the barrier-type alumina layer, if the applied voltage is relatively large, a porous alumina layer which has an interpore distance determined depending on the applied voltage is not formed. However, by forming a barrier-type alumina layer beforehand, a porous alumina layer can be formed which has a large interpore distance as compared with a porous alumina layer that is formed without formation of the barrier-type alumina layer.

Thus, by forming a barrier-type alumina layer beforehand, a porous alumina layer which has an interpore distance of a desired magnitude can be formed. Even when the applied voltage is relatively large, by forming a barrier-type alumina layer beforehand, a porous alumina layer can be formed which has a large interpore distance as compared with a porous alumina layer that is formed without formation of the barrier-type alumina layer.

As seen from the comparison of Tables 3 and 4 with Table 1, the porous alumina layers of Inventive Examples 10 to 21 had greater interpore distances than the porous alumina layers of Inventive Examples 1 to 9. Particularly in Inventive Examples 16 to 21, the resultant porous alumina layers had interpore distances of not less than 400 nm.

A porous alumina layer whose interpore distance is not less than 400 nm, for example, can be used as a moth-eye mold 100A that is for use in manufacturing an antireflection film in which the interval of protrusions that form the moth-eye structure is not less than 400 nm as will be described later. An uneven structure which is provided for the purpose of improving the light condensing efficiency of the surface of a solar cell, for example, can be formed using a mold which has a porous alumina layer whose interpore distance is not less than 400 nm. Also, the mold which has a porous alumina layer whose interpore distance is not less than 400 nm can be used as a mold for formation of photonic crystal.

Next, a method of fabricating a moth-eye mold 100A (FIG. 10) with the use of the above-described porous alumina layer 14 is described with reference to FIG. 9. The moth-eye mold 100A may be formed according to the same method as that disclosed in aforementioned Patent Document 4 (WO 2006/059686).

As shown in FIG. 9(a), the porous alumina layer 14 is formed over the aluminum base 10 according to the method which has previously been described with reference to FIGS. 1(a) to 1(c). In FIG. 9, for the sake of simplicity, the glass substrate 16 is omitted.

Then, the porous alumina layer 14 that has the micropores 14p is brought into contact with an alumina etchant such that a predetermined amount is etched away, whereby the pore diameter of the micropores 14p is increased as shown in FIG. 9(b). Here, wet etching may be employed such that the pore wall and the barrier layer can be generally isotropically etched. By modifying the type and concentration of the etching solution and the etching duration, the etching amount (i.e., the size and depth of the micropores 14p) can be controlled. The etching solution used may be, for example, an aqueous solution of 10 mass % phosphoric acid or organic acid, such as formic acid, acetic acid, citric acid, or the like, or a chromium-phosphoric acid mixture solution.

Then, the aluminum film 18 is again partially anodized such that the micropores 14p are grown in the depth direction and the thickness of the porous alumina layer 14 is increased as shown in FIG. 9(c). Here, the growth of the micropores 14p starts at the bottoms of the micropores 14p which have already been formed, so that the micropores 14p have stepped lateral surfaces.

Thereafter, when necessary, the porous alumina layer 14 may be further brought into contact with an alumina etchant to be further etched such that the pore diameter of the micropores 14p is further increased as shown in FIG. 9(d). The etching solution used in this step may preferably be the above-described etching solution. Practically, the same etching bath may be used.

In this way, by alternately repeating the anodization step (FIG. 9(c)) and the etching step (FIG. 9(d)) which have been described above, a moth-eye mold 100A which includes the porous alumina layer 14 that has the micropores (minute recessed portions) 14p of a desired uneven shape is obtained as shown in FIG. 10. Note that, in order to manufacture an antireflection film which provides an excellent antireflection performance, the two-dimensional size of the micropores 14p when viewed in a direction normal to the surface is preferably not less than 10 nm and less than 500 nm (see Patent Documents 1, 2, and 4).

The moth-eye mold 100A is fabricated using a porous alumina layer which is formed according to the above-described formation method and therefore has an interpore distance of, for example, 400 nm across the surface. Such a moth-eye mold which has an interpore distance of not less than 400 nm has advantages which will be described below.

When an antireflection film is manufactured using a moth-eye mold whose interpore distance is about 200 nm, a plurality of protrusions at the surface of the antireflection film may sometimes stick together into bunches (sticking phenomenon). At the bunches of the plurality of protrusions, the amount of light scattered by the surface is larger. When an antireflection film is manufactured using the moth-eye mold 100A whose interpore distance is not less than 400 nm, the interval between adjacent protrusions at the surface of the antireflection film can be not less than 400 nm, so that the protrusions are unlikely to stick together. That is, the probability of occurrence of the sticking phenomenon can be reduced.

In moth-eye mold 100A, when used in manufacturing an antireflection film, the two-dimensional size (diameter) of the micropores is approximately equal to the interpore distance. Therefore, by increasing the interpore distance, the diameter of the micropores can be increased. By increasing the diameter of the micropores, the aspect ratio of the micropores (micropore depth/micropore diameter) can be decreased. For example, when the micropore depth is not changed, by making the interpore distance not less than 400 nm, the aspect ratio can be decreased to a value which is not more than ½ of that of a moth-eye mold whose interpore distance is about 200 nm. If the aspect ratio is low, the transfer can readily be realized, and accordingly, the selectivity as to the resin for use in the transfer advantageously improves. Further, even if dirt is trapped in the micropores, a low micropore aspect ratio facilitates removal of the dirt. Thus, the dirt-repellency can be improved.

When used as a moth-eye mold, the aspect ratio of the micropores is preferably not less than 0.5 and not more than 4.0, more preferably not less than 1.0 and not more than 3.0.

Now, a method of manufacturing an antireflection film according to an embodiment of the present invention is described with reference to FIG. 11.

As shown in FIG. 11, the moth-eye mold 100A is provided.

A UV-curable resin 32, which is provided between a surface of a work 42 and a mold, is irradiated with ultraviolet (UV) light through the mold such that the UV-curable resin 32 is cured. The UV-curable resin 32 may be provided over the surface of the work 42 or may be provided over a mold surface of the mold (a surface of the mold which has the moth-eye structure). The UV-curable resin used may be, for example, an acrylic resin.

Thereafter, the moth-eye mold 100A is separated from the work 42, whereby a cured material layer of the UV-curable resin 32, to which the uneven structure of the moth-eye mold 100A is transferred, is formed over the surface of the work 42.

In the descriptions provided above, a method of forming a porous alumina layer has been described wherein an aluminum film in which the average grain diameter of crystal grains that form the aluminum film is 180 nm to 190 nm is used to form a porous alumina layer that has an interpore distance greater than the average grain diameter (about 210 nm to about 720 nm). However, the present invention is not limited to this example but may also be applicable to formation of an alumina layer which has an interpore distance of not less than 50 nm. An advantage of the present invention such that by forming a barrier-type alumina layer beforehand, a porous alumina layer which has a desired interpore distance can stably be formed without being restricted by the crystal grain diameter, can be achieved irrespective of the average grain diameter of the crystal grains that form the aluminum film or the interpore distance of the porous alumina layer which is to be formed. Note that the thickness of a barrier layer in a porous alumina layer which has an interpore distance of about 50 nm is about 25 nm or smaller. When the thickness of the barrier layer is about 25 nm, the barrier-type alumina layer that is formed earlier has a relatively small thickness, which is specifically not more than 25 nm. Even when forming a barrier-type alumina layer which has a relatively small thickness of about 25 nm, the effect of the present invention can be achieved such that a porous alumina layer which has a desired interpore distance can stably be formed.

As described above, the micropores of the porous alumina layer 14 of the moth-eye mold 100A for use in manufacturing an antireflection film have a conical shape. The two-dimensional size of the micropores when viewed in a direction normal to the surface (the diameter of the micropores) is generally equal to the interpore distance. Therefore, in the moth-eye mold 100A for use in manufacturing an antireflection film, when the interpore distance of the porous alumina layer 14 is not less than 50 nm and less than 500 nm, the two-dimensional size (diameter) of the micropores is not less than 50 nm and less than 500 nm. When using a moth-eye mold that includes a porous alumina layer in which the two-dimensional size of micropores when viewed in a direction normal to the surface is not less than 50 nm and less than 500 nm, an antireflection film is obtained which has a plurality of raised portions whose base has a two-dimensional size (diameter) of not less than 50 nm and less than 500 nm.

The shape and the size of the micropores can be changed by modifying, for example, the conditions and the number of cycles of the anodization (the second and subsequent anodization cycles) and/or the conditions and the number of cycles of the etching.

In the examples described above, an aluminum film formed over a substrate using a thin film deposition technique is used. However, the embodiment of the present invention is also applicable to a bulk of an aluminum material. The present inventor performed the anodization using a bulk material which has scars caused by machining in its surface and sometimes found micropores formed along the machining scars. Also in the case where a porous alumina layer is formed by anodizing a bulk material which has machining scars in its surface, a barrier-type alumina layer is formed prior to the anodization for formation of the porous alumina layer, whereby the positions where the micropores are to be formed are prevented from being limited to the machining scars. For example, even when the positions where the micropores are to be formed are limited to the machining scars and uniform distribution of the micropores is interrupted due to the presence of machining scars in the surface, uniform distribution of the micropores can be realized by forming the barrier-type alumina layer, without being limited to the machining scars.

The problem which has previously been described with reference to FIG. 8C(b), that a porous alumina layer which has a large interpore distance cannot be formed even when a relatively high voltage (e.g., 200 V) is applied for the purpose of increasing the interpore distance, may occur not only in the case of a deposited aluminum film or bulk aluminum material which has an uneven shape over its surface but also in the case of an aluminum base which has a relatively flat surface. Anodizing an aluminum base with a relatively high voltage may lead to a problem that the local dissolution in Mode II begins before the volume expansion of the barrier layer formed in Mode I sufficiently advances, and then, the process transitions to Mode III so that micropores are formed, and thus, a porous alumina layer which has a large interpore distance cannot be formed. Even when an aluminum base which has a relatively flat surface is used, a porous alumina layer which has an interpore distance of a desired magnitude can be formed by forming a barrier-type alumina layer as previously described with reference to FIG. 8C(c).

INDUSTRIAL APPLICABILITY

The present invention is applicable to molds for use in manufacturing an antireflection film, an uneven structure over a surface of a solar cell, photonic crystal, etc. The antireflection film is applicable to various uses of which antireflection is demanded, typically to optical elements for use in display devices or the like.

REFERENCE SIGNS LIST 10 aluminum base
12 barrier-type alumina layer
14 porous alumina layer
14a porous layer
14b barrier layer
14p micropores (inverted moth-eye structure)
16 substrate
18 aluminum film
18s surface
100A moth-eye mold

The invention claimed is:

1. A method of forming an anodized layer, comprising the steps of:
 (a) providing an aluminum base which has a surface that is made of aluminum;
 (b) anodizing the surface to form a barrier-type alumina layer; and
 (c) after step (b), further anodizing the surface to form a porous alumina layer which has a plurality of minute recessed portions, wherein the anodization in step (c) is performed with application of a pulse voltage, the pulse voltage having a pulse width of not more than 200 msec and a pulse interval of not less than 800 msec, wherein step (b) is performed in a first electrolytic solution, and step (c) is performed in a second electrolytic solution which is different from the first electrolytic solution, and wherein the different is that the first electrolytic solution is an aqueous solution containing at least one of acids or salts selected from a group consisting of ammonium tartrate, potassium sodium tartrate, boric acid, ammonium borate, ammonium oxalate, ammonium citrate, maleic acid, malonic acid, phthalic acid, and citric acid and the second electrolytic solution is an aqueous solution containing an acid selected from a group consisting of sulfuric acid, oxalic acid, tartaric acid, phosphoric acid, chromic acid and malic acid.

2. The method of claim 1, wherein pH of the first electrolytic solution is more than 3.0 and less than 8.0.

3. The method of claim 1, further comprising:
 (d) after step (c), bringing the porous alumina layer into contact with an etching solution, thereby enlarging the plurality of minute recessed portions of the porous alumina layer; and
 (e) after step (d), further performing an anodization to grow the plurality of minute recessed portions.

4. A method of fabricating a mold which has an inverted moth-eye structure in its surface using the anodized layer formation method of claim 3, comprising the step of forming a porous alumina layer which has a plurality of minute recessed portions whose two-dimensional size viewed in a direction normal to the surface is not less than 50 nm.

* * * * *